United States Patent
Thomson-Wood et al.

(10) Patent No.: US 10,984,124 B2
(45) Date of Patent: Apr. 20, 2021

(54) METHOD OF MANAGING ACCESS IN A COLLABORATIVE DATA SHARING PLATFORM

(71) Applicant: Bedrock Capital Limited, London (GB)

(72) Inventors: Reuben Robert Thomson-Wood, London (GB); Nicola Melis, London (GB); Maria Rosa Del Rio Llorente, London (GB)

(73) Assignee: BEDROCK CAPITAL LIMITED, London (GB)

( * ) Notice: Subject to any disclaimer, the term of this patent is extended or adjusted under 35 U.S.C. 154(b) by 0 days.

(21) Appl. No.: 17/067,043

(22) Filed: Oct. 9, 2020

(65) Prior Publication Data

US 2021/0081557 A1 Mar. 18, 2021

Related U.S. Application Data

(63) Continuation of application No. PCT/GB2019/051849, filed on Jun. 28, 2019.

(30) Foreign Application Priority Data

Jun. 29, 2018 (GB) ..................... 1810707

(51) Int. Cl.
  *H04L 29/06* (2006.01)
  *G06F 21/62* (2013.01)
  *G06F 21/60* (2013.01)

(52) U.S. Cl.
  CPC ........ *G06F 21/6218* (2013.01); *G06F 21/602* (2013.01)

(58) Field of Classification Search
  CPC .......................... G06F 21/6218; G06F 21/602
  See application file for complete search history.

(56) References Cited

U.S. PATENT DOCUMENTS

| | | | | |
|---|---|---|---|---|
| 10,291,622 | B1* | 5/2019 | Rossman | G06F 21/40 |
| 2012/0117157 | A1* | 5/2012 | Ristock | G06Q 10/101 |
| | | | | 709/205 |
| 2018/0189732 | A1* | 7/2018 | Kozloski | G06F 8/71 |
| 2018/0204213 | A1* | 7/2018 | Zappier | H04L 63/10 |
| 2018/0349621 | A1* | 12/2018 | Schvey | G09C 1/00 |
| 2019/0018984 | A1* | 1/2019 | Setty | H04L 63/14 |
| 2019/0058709 | A1* | 2/2019 | Kempf | H04L 9/3226 |
| 2019/0129809 | A1* | 5/2019 | Basu | H04L 9/085 |
| 2019/0156332 | A1* | 5/2019 | Christidis | H04L 9/14 |

(Continued)

OTHER PUBLICATIONS

Anonymous, "Blockchain -", Wikipedia; Retrieved from the Internet: URL:https://en.wikipedia.org/w/index.php? title=Blockchain &oldid=776782677; [retrieved on Aug. 16, 2019 XP055613417, Apr. 23, 2017.

(Continued)

*Primary Examiner* — Shin-Hon (Eric) Chen
(74) *Attorney, Agent, or Firm* — Saul Ewing Arnstein & Lehr LLP

(57) ABSTRACT

There is provided a computer implemented method of managing access in a collaborative data sharing platform, the platform comprising blockchain nodes. The method comprises receiving a read transaction request and processing the transaction request with a consensus algorithm. The transaction is then recorded onto the blockchain.

25 Claims, 14 Drawing Sheets

(56) References Cited

U.S. PATENT DOCUMENTS

2019/0287099 A1* 9/2019 Tan .................... G06F 16/2379
2019/0312855 A1* 10/2019 Sharma .................. H04L 67/10
2019/0370760 A1* 12/2019 Kundu ................. G06Q 20/223

OTHER PUBLICATIONS

Lazarovich, Amir, "Invisible Ink: Blockchain for Data Privacy", Retrieved from the Internet: URL:https://dspace.mit.edu/bitstream/handle/1721.1/98626/920475053-MIT.pdf?sequence=1; [retrieved on Jul. 10, 2017], 2015, 1-85.

Rilee, Kynan, "Understanding Hyperledger Fabric—Endorsing Transactions", Retrieved from the Internet: URL: https://medium.com/kokster/hyperledger-fabric-endorsing-transactions-3c1b7251a709; [retrieved on Sep. 20, 2019] pp. 1-6 XP055624787, Feb. 9, 2018.

* cited by examiner

| __INDEX__ | myTable | myField | 0000000000000000z |
|---|---|---|---|
| Index space | Table name | Field name | Encoded value |

FIGURE 11

| __INDEX | myTable | myString | 00000000000000z | e80ufu284fh7934qrfc8q40ru2h84gfh2 |
|---|---|---|---|---|
| Index space | Table name | Field name | Encoded value | sha256(key) |

FIGURE 12

METHOD OF MANAGING ACCESS IN A COLLABORATIVE DATA SHARING PLATFORM

CROSS-REFERENCE TO RELATED APPLICATIONS

This is a continuation of copending PCT International Application No. PCT/GB2019/051849, filed on Jun. 28, 2019, which claims priority to GB Application No. GB1810707.8, filed on Jun. 29, 2018, the entire contents of each of which being fully incorporated herein by reference.

BACKGROUND OF THE INVENTION

1. Field of the Invention

The field of the invention relates to computer implemented method and system of managing access in a collaborative data sharing platform.

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

2. Description of the Prior Art

Organisations are increasingly looking to share their sensitive data in a secure way. However regular high-profile security breaches demonstrate that there remains a need for a highly secure collaborative data sharing platform that would provide transparency on how data is used and the assurance of who can read the data, when and why.

The Problem of Trust

There is a crisis of trust between modern business and the consumers and organisations with which they trade. Huge data breaches are in the news every day and consumers are increasingly worried about the safety of their personal information. New laws have brought more and more regulation as to how, when, why and with whose consent data can be used with stiff penalties for those who do not comply (European Commission, General Data Protection Regulation—article 84, 2016).

At the same time, businesses increasingly need to share data across perimeters and with partners and service providers. When data is conventionally shared, control is lost but responsibility is not. There is a need, therefore for a decentralised, auditable, secure system for data sharing and control.

Contractual Trust Versus Cryptographic Trust

Conventional solutions to data sharing rely on a combination of secure transport and contractual trust—the assurance that the force of law will prevent poor behaviour. In today's world, however, the financial penalties that can be imposed on partners rarely approach the consequences faced by the owner of the data in terms of direct and indirect financial losses, including loss of goodwill, fines from regulators and loss of business. In addition, whilst contractual trust provides a strong disincentive to misfeasance from the partner itself, it does not adequately address the risks from individual employees and others who would be tempted to misuse the data.

It is, therefore, necessary to look for a stronger form of trust. Cryptographically assured trust—a method by which it can be made mathematically extremely difficult to subvert data from its intended purpose—provides a significantly more robust alternative.

Blockchain and its Variants

Blockchain has emerged over the last few years as not just the mechanism underpinning electronic currencies such as Bitcoin (Nakamoto, Satoshi, Bitcoin: A peer-to-peer electronic cash system 2010, https://bitcoin.org/bitcoin.pdf) and Monero (van Saberhagen, Nicolas, CryptoNote v2.0 2013, https://github.com/monero-project/research-lab/blob/master/whitepaper/whitepaper.pdf), but also as the framework by which trust between multiple entities can be established for diverse purposes. Examples of this include public systems utilising "smart contracts" to deliver consensus outcomes for transactions such as Ethereum ("A Next-Generation Smart Contract and Decentralized Application Platform", https://github.com/ethereum/wiki/wiki/White-Paper) and Stellar; private, permissioned data stores like the Hyperledger products; and private enterprise platforms such as R3 Corda (Corda: A distributed ledger 2016, https://docs.corda.net/_static/corda-technical-whitepaper.pdf).

However, current blockchain solutions do not make it possible to collaboratively share sensitive data in a secure, controlled way.

The present invention addresses the above vulnerabilities and also other problems not described above.

SUMMARY OF THE INVENTION

The invention is a computer implemented method of managing access in a collaborative data sharing platform, the platform comprising blockchain nodes, the method comprising receiving a read transaction request and processing the transaction request with a consensus algorithm.

Optional features in an implementation of the invention include any one or more of the following:

The method further includes recording the transaction onto the blockchain.

The consensus algorithm is a *byzantine*-fault-tolerant (BFT) algorithm.

Each node defines rules or policies providing a granular access of their data.

The transaction request is requested by a user that is a third party user located externally to the blockchain nodes.

The consensus algorithm relates to an algorithm that determines if there is a collective agreement amongst the peers, nodes or other subsystem of the blockchain.

The consensus algorithm permits the read when a quorum of signatures for the blockchain is reached.

The consensus algorithm permits the read to take place only if there is a consensus amongst the peers, nodes, or other subsystem of the blockchain to permit the read.

The method is used to process a write transaction request.

The consensus algorithm also processes a write transaction request as well as a read transaction request.

The consensus algorithm uses a proof of authority algorithm.

The BFT algorithm is practical BFT algorithm.

The method further includes the step of recording a user's intent on the blockchain, such as what the user is trying to do.

The transaction request is recorded onto the blockchain by cutting a block and distributing it onto the blockchain.

The consensus algorithm decides which node cuts the block.

A node within the blockchain cannot bypass the consensus algorithm in order to access the blockchain.

The method further implements a deterministic index algorithm for indexing the data in the blockchain nodes.

The method is used to prevent data access to the blockchain.

The method is performed in real time.

The method further comprising: (i) sending a response to the transaction request to a keystore which decrypts the transaction response when a consensus is reached, and (ii) recording the transaction onto the blockchain.

The keystore permits the decryption of data only if a transaction is correctly endorsed or approved by the consensus algorithm.

The keystore permits the decryption of data only if a defined number of decryption key owners agree.

The keystore is located externally to the blockchain nodes,

The keystore is located locally to the blockchain nodes of the user that requested the transaction.

Each peer of the blockchain simulates the transaction request and sends its signed response.

Responses are combined and submitted to the keystore.

Multiple keystores for different types of data are available in a collaborative data sharing platform.

The keystore does not store keys and implements a key derivation function.

The keystore encodes and decodes data based on parts of keys unknown to the peers themselves.

The keystore decrypts the transaction response and sends it to the user that requested the transaction.

The transaction request is recorded onto the blockchain by cutting a block and distributing the block onto the blockchain.

The method further comprises: (i) generating an initial encryption key and distributing a set of keys derived from the initial key to a subset of selected endorsed peers, (ii) processing the transaction request by the subset of selected endorsed peers with a consensus algorithm, and (iii) recording the transaction onto the blockchain.

The selected numbed of endorsed peers is the minimum number of peers needed to recover the initial key.

The set of keys are derived by a key derivation algorithm.

The key derivation algorithm includes selecting a constant Hamming distance based on the minimum number of peers.

The constant Hamming distance is selected using Reed-Solomon codes.

The set of keys are distributed in a BFT manner.

Peers within a same class are distributed the same key.

A keystore is used to derive the set of keys from the initial key.

Data stored in the blockchain can be redacted without being recoverable.

Personally identifiable information (PII) data can be stored in the blockchain.

PII data that is stored in the blockchain is rendered unreadable.

PII data is rendered unreadable permanently.

An additional key identifier is stored with the PII data.

The additional key identifier relates to a value stored within a keystore of the PII data owner.

The additional key identifier is added to the key derivation value.

A certificate authority processes a user transaction request and issues ephemeral certificates for accessing the platform.

The identity of the user is communicated within the blockchain by encoding a series of assertions and conditions into the certificate.

The method includes the step of sending a Certificate Signing Request (CSR) to a cross endorsing Certificate Authority (CA).

A cross-endorsing CA returns both a signature over a CSR information section of the certificate as well as any assertions it wishes to add.

A certificate is revoked when the user logs out of the platform.

Hashes of canonicalized transaction inputs and outputs are stored.

Access control of data within the platform is based on contextual access control.

Access control of data or resource within the blockchain is provided to an entity or user when the context information of the user matches the rule or policy associated with the requested data.

Context information includes who the user is, what they are doing and how they are doing it.

Context information also includes intent of the user.

The method includes the step of processing a user transaction request and deriving the user's intent.

The user's intent is stored in the form of protocol buffers format.

An endorsement policy define the entities of the blockchain able to endorse access control of specific data or resource.

An endorsement policy requires a predefined number of entities to endorse access control of specific data or resources.

The method further implements a hierarchical based access control.

Access control is provided by a consensus agreement of all entities or users of and of the owner of the data.

A plurality of entities are represented in the form of a graph database that is linked to the nodes of the blockchain.

An entity is a user, node, peer or other subsystem of the blockchain.

The graph database encodes one or more rules or policies for accessing a specific data or resource of the blockchain.

The graph database encodes an ownership path for each data or resource of the blockchain.

A rule includes that data can only be viewed if a number of conditions are satisfied.

A rule includes that data cannot be viewed but questions on the data can be answered.

Access control of data is based on contextual access control, such as who the user is, what they are doing, how they are doing it.

The graph database encodes the entities or users contextual information.

The graph database is a shared store of enterprise information.

The graph database is a distributed graph database that runs on top of the blockchain nodes.

Another aspect of the invention is a computer implemented system of managing the access in a collaborative data sharing platform, in which the collaborative data sharing platform comprises blockchain nodes or any other blockchain subsystem, and in which the system is configured to receive a read transaction request and to process the transaction request with a consensus algorithm.

The system implements any of the method steps defined above.

BRIEF DESCRIPTION OF THE FIGURES

Aspects of the invention will now be described, by way of example(s), with reference to the following Figures, which each show features of an implementation of the invention:

FIG. 11 shows a table format for storing a key using the deterministic indexing algorithm.

FIG. 12 shows a table format for storing a key using the deterministic indexing algorithm.

DETAILED DESCRIPTION

Figure 1:
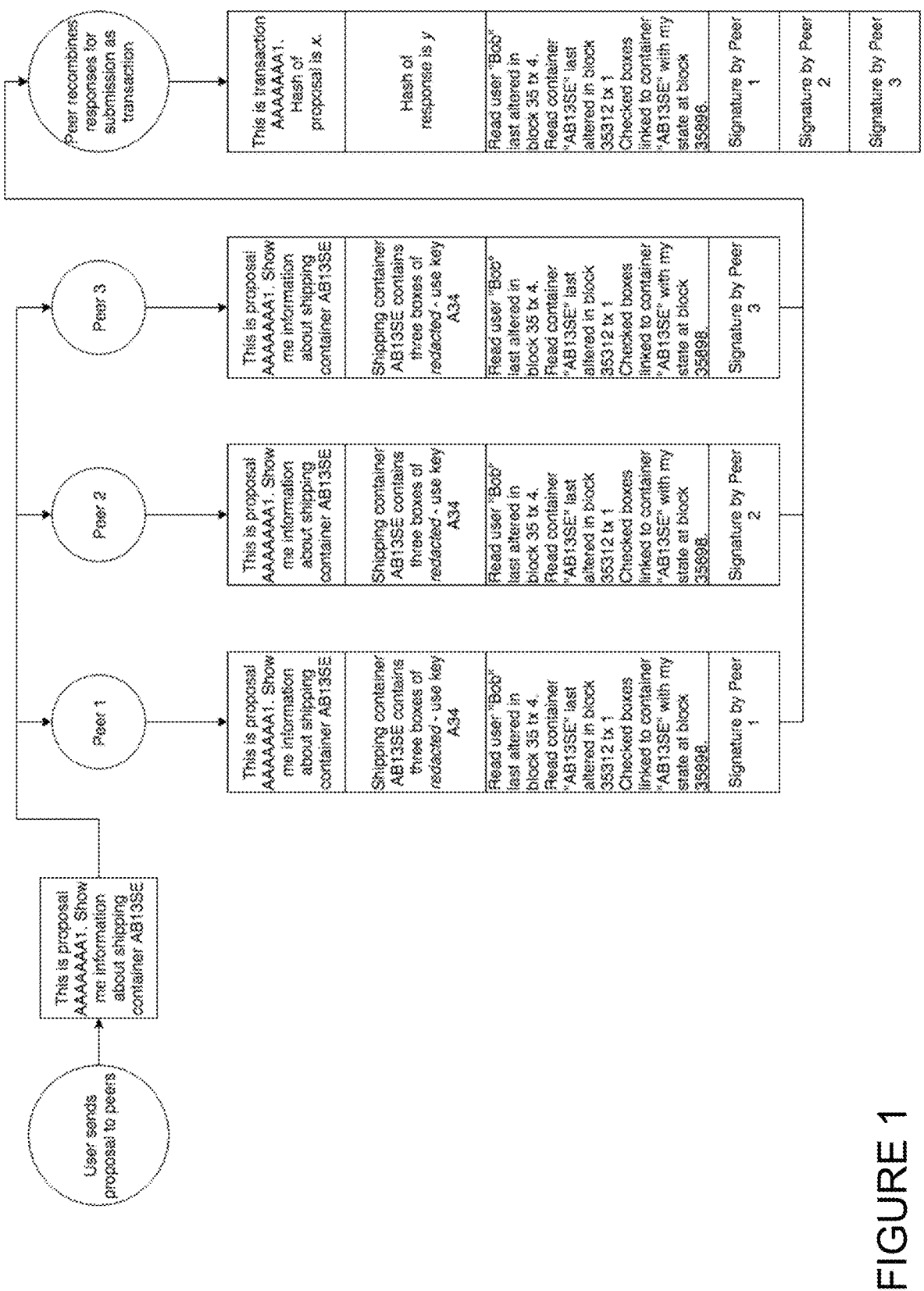
FIG. 1 shows a flow diagram of sending a proposal to a blockchain network.

This Detailed Description section describes one implementation of the invention, called of Gospel or The Gospel platform.

1. Overview of Gospel

The Gospel platform enables organisations to share sensitive data (for example financial, shopping, health care, travel, social media or any other sensitive data) externally whilst still maintaining control of their data. Trust is never assumed but always collected through a collective agreement.

Delivering Truly Trusted Data Sharing Using Innovative Blockchain Consensus and Contextual Access Control Gospel provides a system to ensure that reads and writes to data can only be made with the consensus agreement of all parties and the owner of the data.

In addition, Gospel has designed systems to control access to data within that shared data environment based on consensus; to ensure that no party can unilaterally prevent others from gaining the agreed access to data; and to allow rapid retrieval of data using indices without compromising the necessarily deterministic nature of the system.

Lastly, Gospel has delivered an innovative identity integration and management system that is verifiable across multiple organisations throughout the lifecycle of the data.

Collectively, these methods ensure data can only be used for trusted, mutually agreed purposes, reducing speculative data sharing and removing many of the risks inherent in a distributed system.

Secure Data Platform

The Gospel platform is a secure data platform that is a shared store of enterprise information spread amongst a number of entities presented in the form of a graph database. Access control is enforced at the data layer based on the context of who the user is, what they are doing and how they are doing it. Consensus amongst the peers of the underlying blockchain network is used to calculate and enforce read and write access control and instances of a specially designed external component (the "keystore") is used to ensure that the consensus mechanism cannot be bypassed.

These factors combined lead to the establishment of effective cryptographic trust. Put simply, the existence of a shared ledger of all accesses means that all parties have the assurance that data has only been used in the way that was agreed and intended. In addition, as the system provides *Byzantine* fault tolerant (BFT) assurance that data cannot be unilaterally accessed in contravention of the access control mechanisms agreed, all parties can rest assured that data cannot be accessed without permission now or in the future.

As described in the sections below, each peer can authorise access to permissible data through a collective agreement. By implementing BFT, all blockchains work across a distributed network of nodes to provide a level of objective agreement, and no one party is trusted and any transactions or access must be approved by the overriding agreement of all other nodes. Additionally, it is not possible to take data outside of the blockchain and being able to read as the agreement of the network would still be needed.

By recording each transaction onto the blockchain, the system is transparent. Once something has been written to the blockchain (hashed) it cannot be removed. Thus it provides a traceable, auditable, traceable record of all and any transactions in whatever form have ever occurred on that chains data, and reflects a true and trusted world state at any point in time.

A "peer" refers specifically to the component that represents a company's membership of a collaborative data sharing platform. This contains a copy of the ledger and the ability to run the chaincode or "brain" of the system against a particular transaction proposal.

A "node" refers to a logical instance of all the components required by a single company, containing a copy of the ledger. This includes such things as a peer, orderer, middleware components, keystore and CA.

Consensus can therefore be leveraged to provide far higher assurance of what data is allowed to be read and prevent single malicious actors seizing control of data assets. In addition two level identity management and enforcement of security using *Byzantine* fault tolerance are also described in the following sections.

2. Endorsed Blockchains

Early blockchain systems calculated the result of transactions after they had been cut into blocks and the entire result was necessarily calculable by anyone holding a copy of the world state. Ethereum's world computer continues to operate in this manner as do many other second and third generation systems.

More recently, some systems have separated transaction simulation from execution, most notably Hyperledger Fabric. This has a number of advantages:

1. Not all peers must expend runtime executing every transaction—a representative sample can be employed 2. The success (or otherwise) of a transaction can be known before it is cut into a block
3. Different methods can be leveraged for outcome and distribution consensus. In particular, this stage is inherently a form of *Byzantine* Fault Tolerance where more than one signature is required.
4. Not all peers that have the world state necessarily need to understand all of it.

As shown in FIG. 1, this works by sending a proposal to a number of peers. Each peer will calculate the result of the transaction based on the state of the world as it understands it and sign a Merkle hash of the proposal and the entities changed by the proposal if it were executed. In addition, it's generally desirable to include relevant hashes of the data relied upon to calculate the result and any user-facing response returned. The signature returned by each peer is then attached to a single copy of the result and this is then submitted to be cut into a block. As long as the quorum of signatures for the chain is reached the transaction will be cut into a block and executed on each peer as it is validated and received.

2.1 Intent Data Versus Input Data

Many endorsed blockchain systems store transaction input and response with the transaction. This is, however, impractical with Gospel as it will result in exposure of sensitive data when saves are performed. The importance of the user's intent when auditing transactions post factum cannot, however, be exaggerated.

Intent data is, therefore, extracted from the input and written to the resulting changeset by the peers and hashes of the canonicalized transaction inputs and outputs are stored so that the veracity of the information returned to the client can be verified against the chain. It can be trusted as it has been verified by multiple peers and has been through BFT.

Intent data is, like other data in the Gospel platform, stored in the form of Protocol Buffers format. Two message types are used:

message Intent {
   string action=1;
   bytes key=2;
   string actor=3;
   bytes certificate_subject_key=4;
}
message Output {
   bytes key=1;
   uint32 version=2;
   repeated string fields=3;
}

The Intent message type contains information about what call was made by the user—ie what they were asking for—and who they are. One instance is stored for a transaction. The Output message type contains the identification of an item that was returned as well as what fields were returned from it. Many of the Output items may be stored.

3. Managing Identity 3.1 Identity on Public Blockchains

In a traditional, public cryptocurrency blockchain, there is one level of identity, representing the owner of a balance, expressed in the form of a public key or the hash thereof. Nodes connecting to the network are unauthenticated as the network is "public" and proof-of-work is generally used to prevent malicious actors cutting blocks without the consensus of the network as a whole (Nakamoto, Satoshi, Bitcoin: A peer-to-peer electronic cash system 2010 https://bitcoin.org/bitcoin.pdf). Private networks have tended to authenticate solely at the machine level, with each node possessing a certificate that the others recognise as a valid member of the network.

3.2 Identity in Gospel

With a system such as Gospel, the identity of an individual communicating with the network is also as important as that of the nodes but can't be boiled down to a single public key. As a result, identity information is linked using a standard x509 (Cooper, D. et al, RFC 5280 2008, https://www.ietf.org/rfc/rfc5280.txt) certificate and keypair in a manner that can be verified by all members of the network without recourse to oracles. Certificate Authorities (CA) run using Gospel software are used to provide a hierarchy of trust that matches the standard models of Public Key Infrastructure (PKI).

3.2.1 PKI Hierarchy in Gospel

Gospel recognises the idea of namespaces—each usually representing the data belonging to a particular company. Each namespace is represented by an intermediate certificate recognised by the network and a CA represents a particular set of namespaces, signing certificates with the intermediates it possesses. In addition, intermediates to identity the network as a whole (the node certificates) and for administrative purposes are created.

Figure 2:
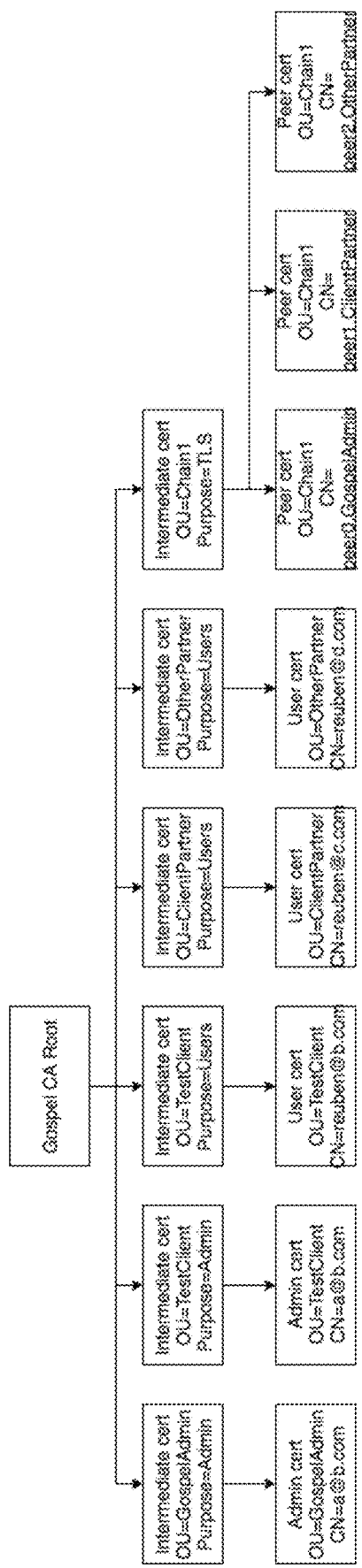
FIG. 2 shows a representation of a CA root with PKI hierarchy.

FIG. 2 shows an example of a CA root diagram with PKI hierarchy.

3.2.2 Handling Revocation

As almost all issued certificates are essentially ephemeral—they have lives in single digit numbers of hours—it's particularly important that the chain can immediately identify when a certificate has become invalid. In addition, we need to be able to identify whether a certificate was valid at the time at which a transaction was executed more often than whether it is valid now. As a result, storing revocation information in the chain itself provides both point in time information and the knowledge that there is a non-oracling view of revocation with all peers becoming aware of the revocation at the same time. User logouts are handled by revoking the certificate.

3.3 Integrating with Outside Identity Sources

Gospel does not seek to be the underlying source of identity—many existing systems provide this functionality already. What we do, however, need to do is to integrate with those sources and provide sufficient information for the blockchain nodes to confirm the veracity of the identification. To that end, Gospel provides integration with varying sources of identity such as Active Directory, Google Auth, Okta, databases and LDAP; sources of identity assurance such as IP, country or browser verification, second factors like TOTP (D. M'Raihi et al, RFC 6238 2011, https://tools.ietf.org/html/rfc6238), and offline identity verification such as OnFido; and sources of group membership such as Active Directory, LDAP and databases. Due to the asynchronous nature of this process, a queue is used to pass traffic between the components handling each step of verifying the user.

3.3.1 Typical Login Flow for a Web User

Figure 3:
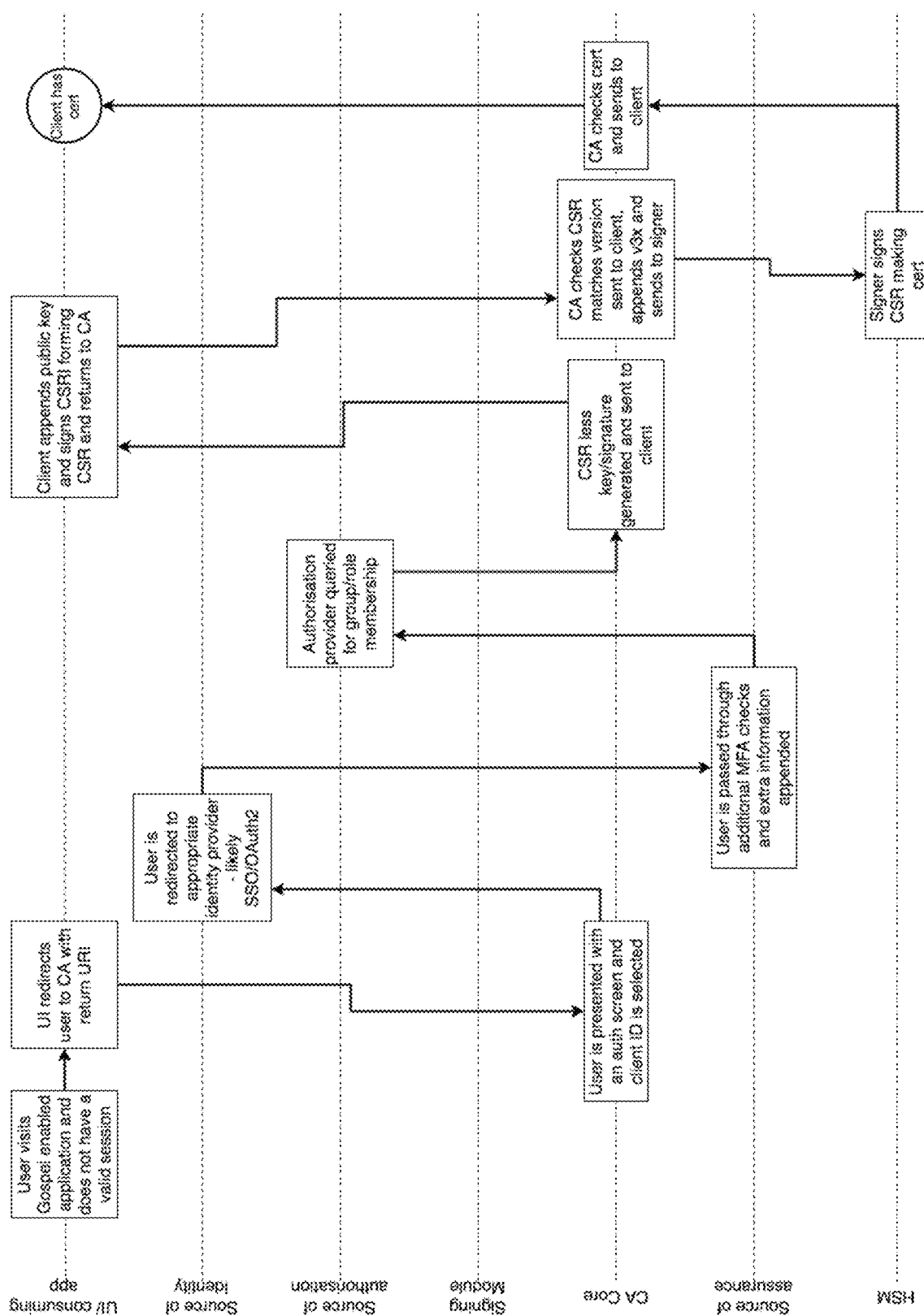
FIG. 3 shows a flow diagram describing the steps from a user visiting a Gospel enabled application to obtaining a certificate.

FIG. 3 shows a flow diagram describing the steps from a user visiting a Gospel enabled application to obtaining a certificate.

3.4 Communicating Identity in the Gospel Platform

Identity is communicated by encoding a series of assertions and conditions into the certificate using x509v3 extensions. The certificate and a signature of the proposal are supplied to each peer endorsing a transaction as part of a "transient map"—it is not necessary to retain the full certificate or signature, just the identity of the actor, as multiple peers have verified the information relied upon to make security decisions.

3.5 Storing Assertions in a Certificate

Assertions can be stored within the user's certificate using the x509v3 extension standard. Gospel Technology has been allocated a code range within ASN1 (International Telecommunication Union, Information technology—ASN.1 encoding rules: Specification of Basic Encoding Rules (BER), Canonical Encoding Rules (CER) and Distinguished Encoding Rules (DER) 2002, https://www.itu.int/ITU-T/study-groups/com17/languages/X.690-0207.pdf) that can be used to encode this information. For example, the following can be used to encode the successful passing of a second factor challenge:

```
SEQUENCE (3 elem)
    OBJECT IDENTIFIER 1.3.6.1.4.1.50822.6
    BOOLEAN true
    OCTET STRING (1 elem)
        SEQUENCE (1 elem)
            SEQUENCE (4 elem)
                SEQUENCE (0 elem)
                UTF8String ASSERTION_CONDITION
                SEQUENCE (2 elem)
                    UTF8String eq
                    UTF8String
                INTEGER 0
```

30 22 06 09 2A 86 48 86 F7 0D 01 09 0E 01 01 FF 04 12 30 10 30 0E 30 0C 06 03 55 1D 13 01 01 FF 04 02 30 00

Or the following for group membership:

```
SEQUENCE (3 elem)
    OBJECT IDENTIFIER 1.3.6.1.4.1.50822.2048
    BOOLEAN true
    OCTET STRING (1 elem)
        SEQUENCE (6 elem)
            SEQUENCE (2 elem)
                UTF8String ADMIN
                UTF8String GospelTest
            SEQUENCE (2 elem)
                UTF8String Managers
                UTF8String GospelTest
            SEQUENCE (2 elem)
                UTF8String Developers
                UTF8String GospelTest
            SEQUENCE (2 elem)
                UTF8String Jenkins Users
                UTF8String GospelTest
            SEQUENCE (2 elem)
                UTF8String DevManagement
                UTF8String GospelTest
            SEQUENCE (2 elem)
                UTF8String NOT_A_REAL_GROUP
                UTF8String GospelTest
```

30 81 CD 06 0A 2B 06 01 04 01 83 8D 06 90 00 01 01 FF 04 81 BB 30 81 B8 30 13 0C 05 41 44 4D 49 4E 0C 0A 47 6F 73 70 65 6C 54 65 73 74 30 16 0C 08 40 40 40 7E 40 21 26 3F 0C 0A 47 6F 73 70 65 6C 54 65 73 74 30 16 0C 08 4D 61 6E 61 67 65 72 73 0C 0A 47 6F 73 70 65 6C 54 65 73 74 30 18 0C 0A 44 65 76 65 6C 6F 70 65 72 73 0C 0A 47 6F 73 70 65 6C 54 65 73 74 30 1A 0C 0C 4A 65 6E 6B 69 6E 73 55 73 65 72 73 0C 0A 47 6F 73 70 65 6C 54 65 73 74 30 1B 0C 0D 44 65 76 4D 61 6E 61 67 65 6D 65 6E 74 0C 0A 47 6F 73 70 65 6C 54 65 73 74 30 1E 0C 10 4E 4F 54 5F 41 5F 52 45 41 4C 5F 47 52 4F 55 50 0C 0A 47 6F 73 70 65 6C 54 65 73 74

The following codes in the range 1.3.6.1.4.1.50822.* have at present been allocated by Gospel

| OID | Usage |
|---|---|
| 1 | Source IP condition |
| 2 | Device ID condition |
| 3 | User agent condition |
| 4 | Request time delta condition |
| 5 | Record value condition |
| 6 | Assertion condition (ie something that we know is true now and how many points apply - eg OTP) |
| 2048 | Group membership |
| 2049 | Comment - usually "Gospel certificates are intended only to be used to communicate with Gospel Technology products. No warranty is made against their use for other purposes." |
| 3192 | Condition points if matched |
| 3193 | Condition points if not matched |
| 4096 | Condition predicate |
| 4097 | Condition match against |
| 4098 | Condition match value selector |

3.6 Cross Endorsement and Labelling

Figure 4:
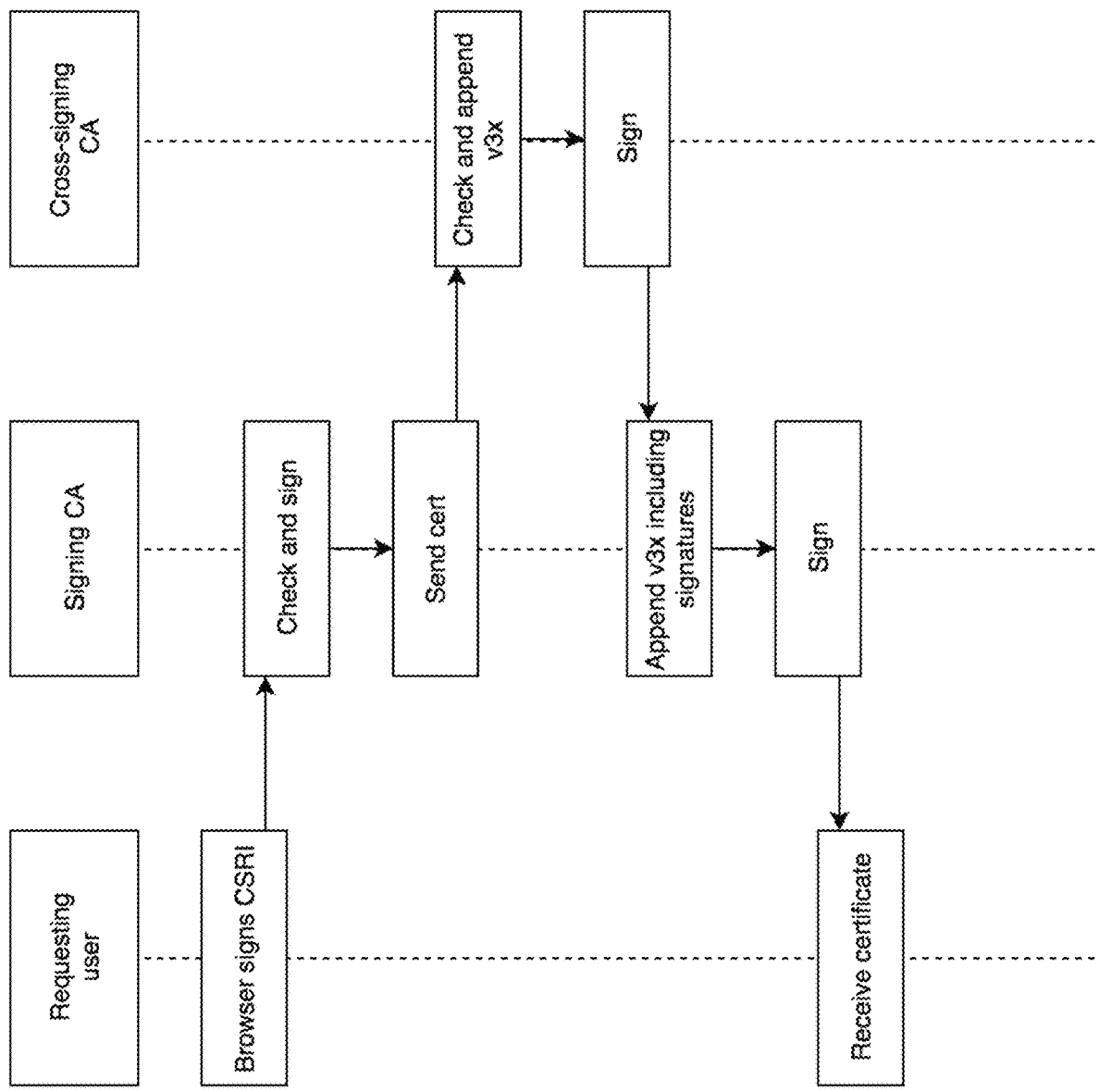
FIG. 4 shows a diagram illustrating cross endorsement and labeling.

With a shared data layer, accessing only data from the company with whom you have logged in is of limited value. It is, therefore, important that the other participating companies can attest the degree to which they trust the login performed by another, and that information is passed to the peers running the chain, as illustrated in FIG. 4.

3.6.1 Defining Relationships for Cross Endorsement

For this to be effective, relationships for cross-endorsement of certificates must be defined between the namespace CAs defining the basis on which, and for whom, cross endorsement will be performed. In addition, the participating companies must record within the chain the extent to which they will respect the assertions made by other companies.

On startup, configuration is passed to the Certificate Authority for a namespace informing it of both side of endorsement relationships. Firstly, which certificates should be sent to other CAs for cross signing is defined:

```
crossSigning:
  - namespace: myNamespace
    server: "ca.my-namespace.com:7777"
    timeoutSeconds: 15
    continueOnFailure: true
    intermediateCert: |         // This should be optional - valid use cases
for both checking and not checking what comes back exist
        -----BEGIN CERTIFICATE-----
        MIIDXKNJWEDUFOWUDUJWUDUWUDWUQ etc
        -----END CERTIFICATE-----
    onlyGroups:                 // NB it only makes sense to have one of the
next two sections
      - groupName
      - otherGroup
    unlessGroups:
      - groupName
      - otherGroup
  - namespace: myOtherNamespace
    server: "my-ca.my-other-namespace.org"
    onlyGroups:
      - admin
```

Then, how to respond to such requests is also defined:

```
crossSigningRequests:
  - namespace: myNamespace          // or "*"
    crossSignRequests: true         // this is useful if "*"is defined but you don't
```

```
want to sign from a particular namespace
    checkUserInIdentitySource: datasourceName     // one of the SoIs defined in the file
or omit key. Check user identity exists.
    appendGroupsFromAuthorisationSource: datasourceName     // one of the SoAus defined
in the file or omit key
    appendConditionsFromAssuranceSources:     // replicate conditions from signing
CA with our points values attached if present
    - ipCheck
    - timeBased2Factor
    onlySignIfAssuranceSources:     // don't sign unless there's a condition from
the signing CA for this source of assurance
    - timeBased2Factor
    onlySignIfInLocalGroup:     // only sign if the user is in this group at our
end
    - myGroup
    - myOtherGroup
```

3.6.2 Recording Cross Endorsements in Certificates

The appended information is in the form of additional x509v3 extensions including a signature of the CSR (Certificate Signing Request) and of the returned extensions by the cross-endorsing CA. These are then wrapped in the overall issued certificate and its signature from the issuer. The cross-endorsing CA will return both a signature over the original CSRI section of the certificate as well as any assertions (see 4.5) it wishes to add. This is then wrapped by the signing CA in an extension of type 1.3.6.1.4.1.50822.4100.

3.6.3 Defining Differential Permissions for External Users

When the certificate is used with the network, permissions can be evaluated against all users, users from a specific namespace or own users only, and different policies set for each. It is possible for groups to be targeted based on those supplied by the namespace or those from the issuer. A cross endorsing policy is unilaterally set in the chain by the receiving company:
{
    "allowedNamespaces": [
    "myNamespace", // or
    "*"
    ],
    "requireCrossSigning": true, // or false . . .
    "pointsModifier": −5// an integer automatically applied to requests from outside this namespace
}

4. Recording Reads

4.1 Writing Reads to the Blockchain

In a system such as Gospel where auditable records of reads as well as writes are necessary, it is possible to record the information given out in the chain as well as the information written. This is achieved by cutting the data accesses into a transaction and writing this to a block.

Within a write transaction in a conventional endorsed blockchain, it's already necessary to record the information relied upon to execute the transaction in order to ensure the state against which it is executed remains consistent at the point of execution. It is, therefore, simple to ensure that transactions with no writes are also submitted for cutting to a block.

4.2 Requiring Consensus for Reads with a Keystore

This does not, however, in itself prevent the reader of the data simply failing to submit the transaction to the chain or querying a single peer owned by themselves and relying on that result. Gospel has, therefore, introduced a novel mechanism to ensure that users cannot bypass this process by introducing an additional component (the "keystore") that encodes and decodes data based on parts of keys unknown to the peers themselves. The keystore is programmed to only decrypt data contained in a correctly endorsed transaction and after it has observed the distribution of that transaction amongst the peers, ensuring the block has been cut to the chain.

The keystore is contained within the network of the company that originated the data, meaning there is no particular downside to them having possession of the keys—they have access to the data anyway, outside of network control. This may mean that it is necessary for multiple actors to maintain keystores for different types of data.

Prior to this, proposals to save data or to define a record format are passed through the keystore before being submitted to the peers so that key information can be attached, or sensitive data can be replaced with an encrypted version thereof.

Figure 5:
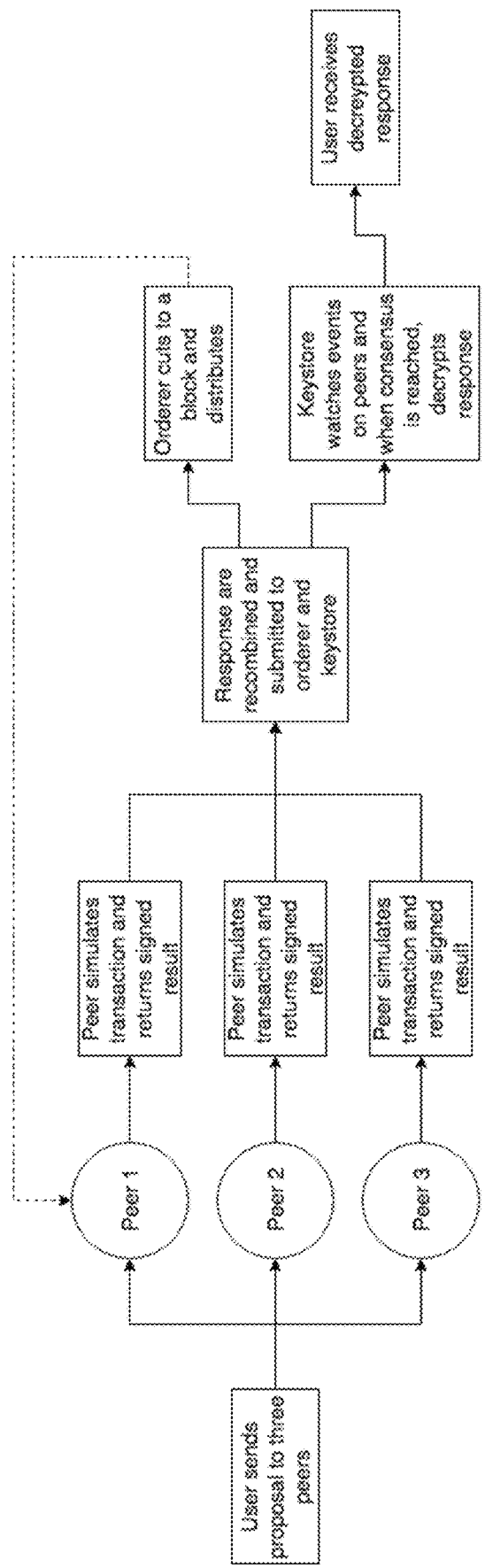
FIG. 5 shows a diagram illustrating the consensus on reads with a keystore.

FIG. 5 shows a diagram illustrating the consensus on reads with a keystore, in which a user sends a transaction request. Each peer simulates the transaction and returns a signed result. The responses are then recombined and submitted to the orderer and to the keystore. The keystore watches events on peers and when a consensus is reached decrypts the response and sends it to the user.

Figure 6:
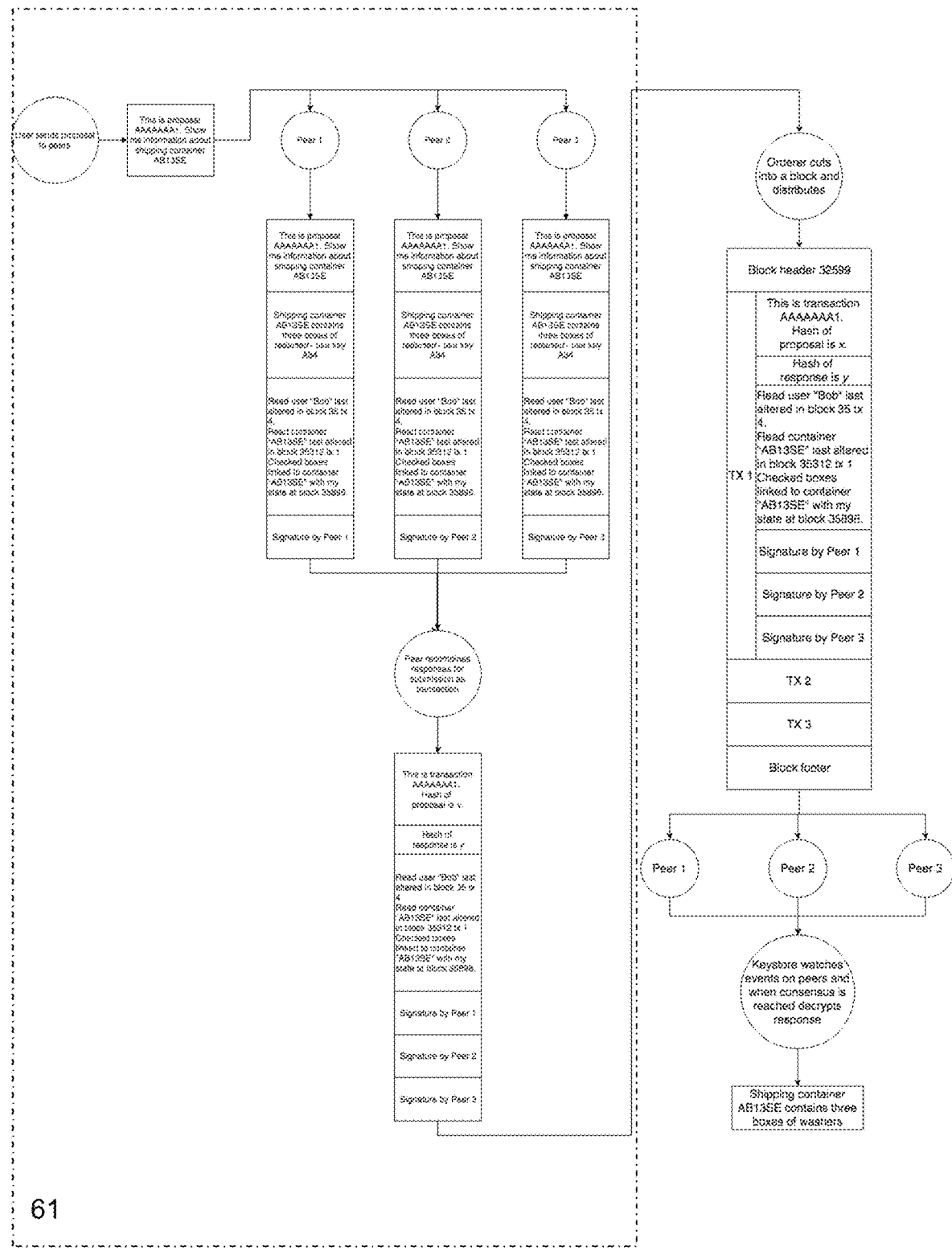
FIG. 6 shows a flow diagram of sending a proposal to a Gospel platform.

A more detailed worked example is shown in FIG. 6, in which the first section 61 of the diagram corresponds to FIG. 1, wherein a user has requested access to read information about a shipping container. When the consensus is reached, the keystore decrypts the response and the user is able to see that the shipping container contains three boxes of washer. The transaction is also recorded onto the blockchain.

4.2.1 Key Derivation

It should be noted that the key denoted by key ID stored in the chain is not actually stored in the keystore—just one element of the information required to derive it. Other parts are submitted to the keystore when it is running (a runtime password) and contained within the data saved in the chain. This means that physically stealing a node and the keystore will not allow access to the data. A standard algorithm is used to derive keys in a safe manner, in our case scrypt (Percival, C. et al, RFC 7914 2016, https://tools.ietf.org/html/rfc7914).

4.2.2 Data Ownership and Multiple Keystores

Where data is returned that is in multiple namespaces, the transaction can be passed by the middleware component through multiple keystores simultaneously and the decrypted information recombined. This does not require the data belonging to companies to be exposed to others as they only see the encrypted version of the sensitive data which is already in their peers.

4.3 Consensus on Reads with Distributed Keys

Although the first generation of our Consensus on Read algorithm described above performs well for data that is clearly owned by a single company being accessed by others, it has inherent shortcomings:

1. The data owner is not protected by the network from malicious use of the data though other participants are.
2. There is a single point of failure—if the data owner is offline, the data cannot be accessed.
3. Decryption is performed by the data owner, meaning that they could theoretically maliciously substitute data.

To this end, a system based on key distribution will perform significantly better; this is what the second generation of Consensus on Read delivers by distributing parts of the key derivation mechanism to participants which they will only give up when presented with a correctly endorsed transaction.

4.3.1 Distributing Keys Effectively

For this mechanism to be effective, an encoding mechanism for the key must be used that enforces the agreement of a minimum number of participants to recover the whole. In effect, allowing less than all the participants to decode the key is reliant on error correction that enforces a particular Hamming distance, in effect describing its ability to fail.

If the recovery is too good, then too few participants will be able to recover the key together. If it is not good enough, then the practical part of *Byzantine* fault tolerance will not be exhibited. It is, therefore, necessary for a more or less exact Hamming distance to be set—if there are five participants or classes of participants and four are needed, then a Hamming distance of 20% of the encoded data length is required adding padding if necessary. For a 256-bit input to the key derivation algorithm that means that the encoded data will be 320 bits long and 64 bits will be given to each participant or group of participants.

Figure 7:
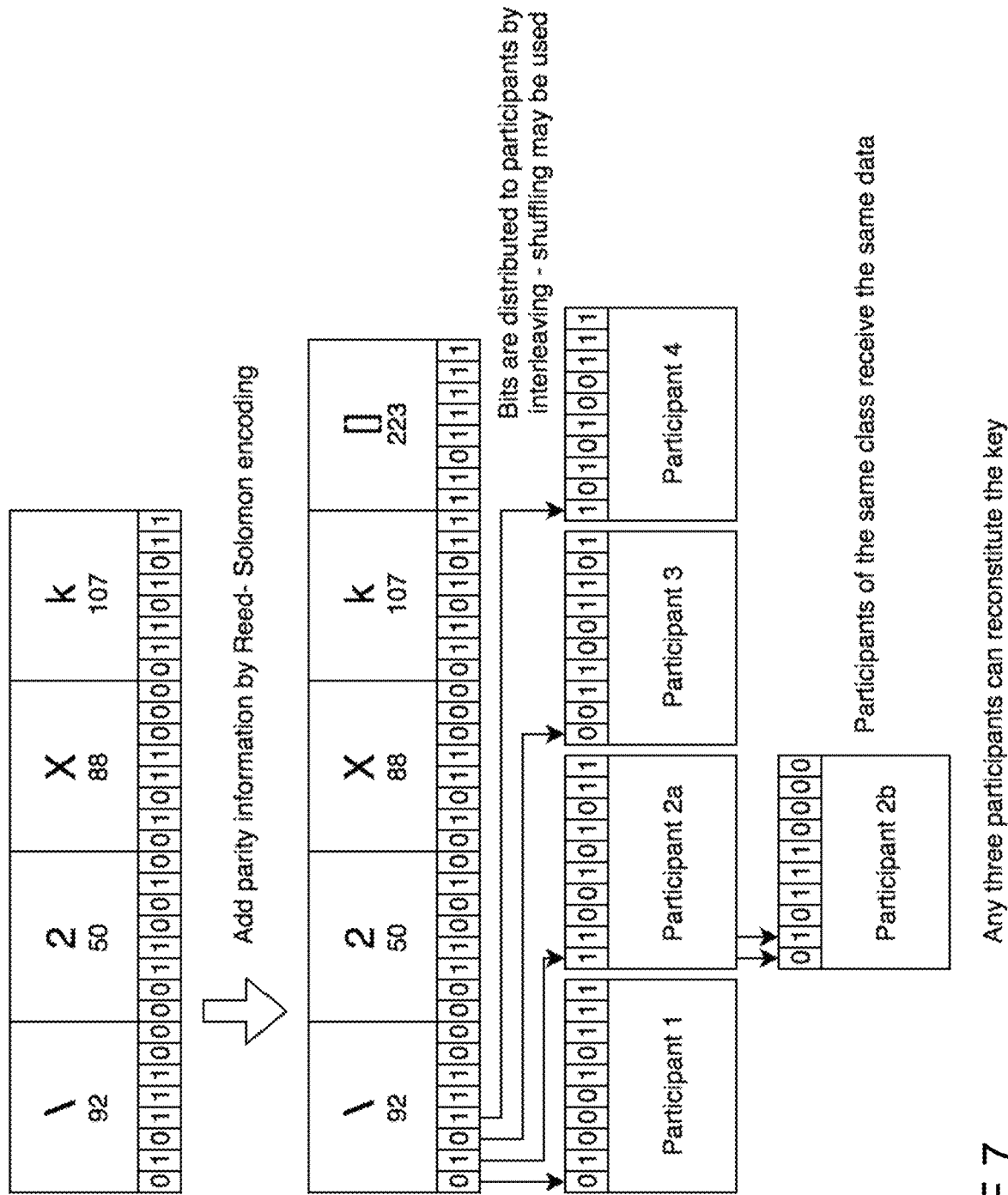
FIG. 7 shows a diagram for the distributed keys encoding mechanism.

FIG. 7 shows a diagram illustration the key distribution algorithm. The parts to be distributed are best picked using binary interleaving as this has the strongest protection against misuse of distributed data.

Keys should still be derived based on the scrypt key derivation algorithm to prevent partial recovery of the key being useful. In addition, this means that the existing mechanism for enforcement of right to be forgotten using a key-value retrieval in the data owner's keystore can still be used. This will look something like key=scrypt(decodedKeyID+recordID+rtbfKey, namespaceKey, 65535, 8, 1, 32)

Although in FIG. 7, the interleave is performed in order, it makes more sense for different interleaves to be used at random. An order can be stored with the encrypted data showing what namespaces have what parts of the interleave.

Namespace keys are known by backend instances that are allowed to talk to a particular namespace, adding an additional factor to the KDF.

Additionally, participants or peers within a same class are distributed the same key. A class may refer for example to participants that belong to a same industry. Classifications are pre-defined and agreed by the entities, peers or nodes within the collaborative data sharing platform and may therefore be pre-programmed.

4.3.2 Using Reed-Solomon Codes to Enforce Hamming Distance

Reed-Solomon codes (Reed, Irving S.; Solomon, Gustave, Polynomial Codes over Certain Finite Fields, Journal of the Society for Industrial and Applied Mathematics 1960, 8 (2): 300-304) are a procedurally generated, well understood and mathematically proven set of error correcting code-sets with known properties, including a consistent, Singleton bound Hamming distance. They are used in many day to day applications including compact discs (in the form of 8-from-14 codes), QR codes and DVB.

Using a Reed-Solomon code set with:

$$k = keyLength \text{ and } n = \frac{keyLength}{numberOfPeersRequired} * totalPeers$$

will give the exact properties which we are seeking above. Encoding and decoding using the BCH view process will not negatively impact performance compared, say, to the first-generation methods.

It should be noted that whilst the error correcting performance of Reed Solomon codes is normally defined as $$\frac{(n-k)}{2}$$

this is only true where the position of errors is not known. As we know which peers did not return data and hence the positionality of the errors, the performance is n−k. Indeed, if we presumed non-positionality, we would be able to correct twice as many "errors" as we desire to compromising the ability to enforce consensus per the agreed rules.

4.3.3 Process Flow

Figure 8:
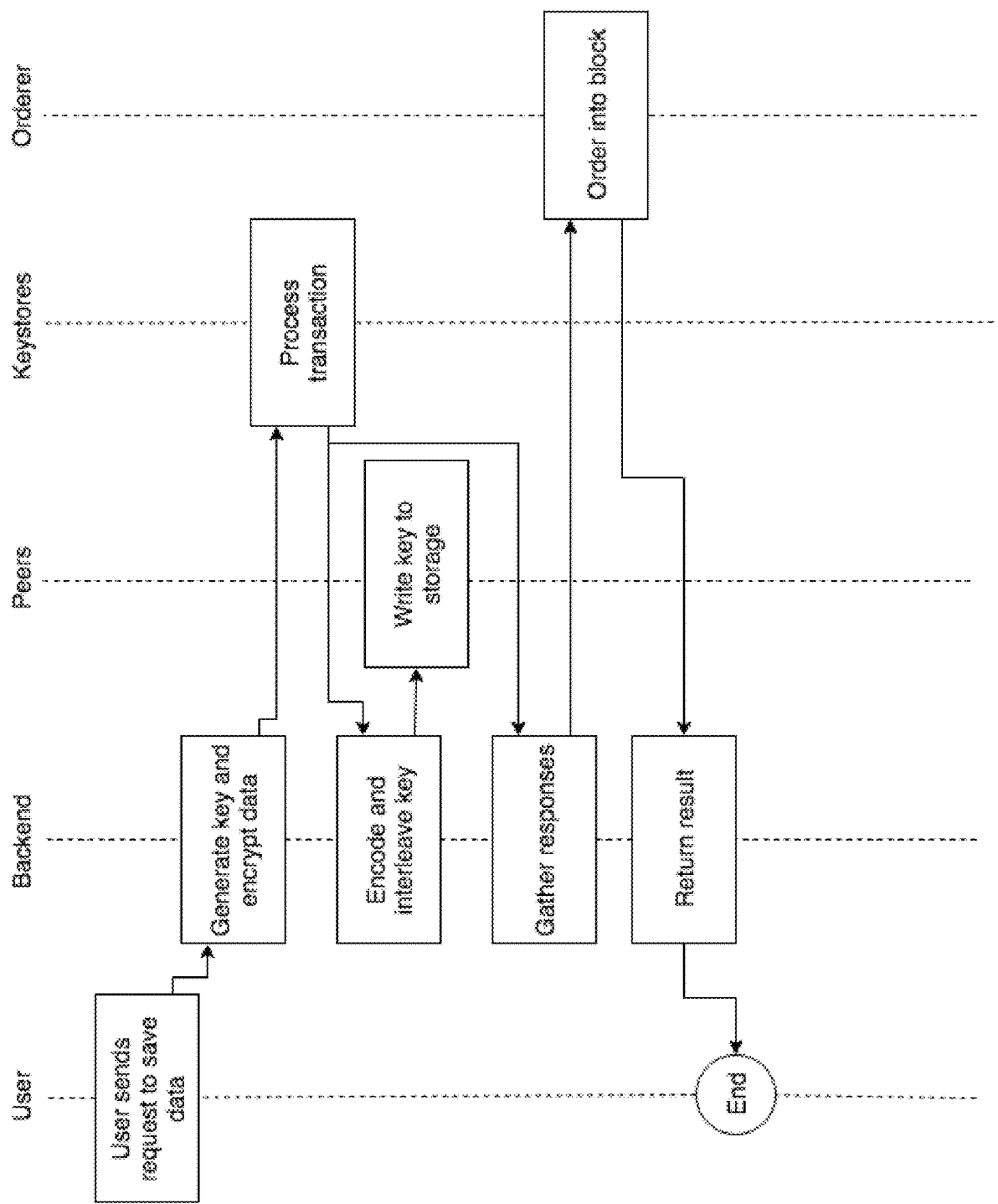
FIG. 8 shows a process flow of managing access control in a collaborative data sharing platform.

FIG. 8 shows a process flow of managing access control in a collaborative data sharing platform. In this example, a request to save data is sent from the user.

4.4 Read Consensus and the Right to be Forgotten

One of the principle objections to the use of blockchain based systems for secure data storage is that their immutable nature makes them unsuitable for storage of Personally Identifiable Information that may need to be redacted later (Kramer, Nicole, Blockchain, Personal Data and the GDPR Right to be Forgotten 2018, https://www.blockchain-andthelaw.com/2018/04/blockchain-personal-data-and-the-gdpr-right-to-be-forgotten/). Even removing data from the tree and relying on Merkle hashes of deleted data for integrity does not guarantee that all participants have actually removed that data from their copies of the chain and/or world state. The Gospel keystore mechanism allows keys to be thrown away, ensuring data can no longer be read. As we rely on block and transaction hashes for integrity rather than predictable initialisation vectors, it is not possible to see whether data is successfully decrypted without access to the information previously in the keystore.

To achieve this, an additional key identifier is stored with the data that relates to a value stored within the keystore for the namespace. This is added to the inputs to the key derivation algorithm, meaning that, should it be deleted, the data is no longer recoverable.

4.5 Returning and Submitting Encrypted Information

A data structure denoting information is encrypted and the information required to go to the keystores for decryption is stored in place of the data when Consensus-on-Reads protection is required. This should be used for PII or other sensitive data only as there is an inherent trade-off between the level of security required and the ability of the platform to make meaningful decisions based on the data. Other data stored is always encrypted at rest and in transit—just not at such a granular level.

With the keystore consensus method, the keystores will substitute the decrypted data for the encrypted version or vice-versa. With the distributed key method, Gospel's middleware application or the user can assemble the key as required. When data is substituted by a keystore or middleware application, that application will sign the resulting data, allowing the peers to check its integrity against a predefined list of who is allowed to make such substitutions. It should be noted that it is important that the substitution is made by the company that owns the data in the keystore model—this prevents the exposure of unencrypted data to other participants' servers to the greatest extent possible.

In many cases it may be desirable to keep a hash of the data or a consistently salted hash of the data with the encrypted version in order that lookups based on equality can be made. There is, as elsewhere, an inherent trade off of security versus utility involved and the decision of whether to do so is best left in the hands of those administering the system, so the option whether to do so is left in their hands.

4.5.1 Example

The intent to encrypt data might be submitted to the network:

```
{
  "id": "myRecord",
  "version": 1,
  "type":{
  "name": "myType",
  "version": 4
  },
  "fields": {
  "simpleField": "simpleValue",
  "myEncryptedField": {
     "keyId": " . . . ",
     "value": " . . . "
  },
  "myOneTimeEncryptedField": {
  "keyId": " . . . ",
  "value": " . . . "
  },
  "myEncryptedHashedField": {
  "keyId": " . . . ",
  "value": " . . . ",
  "hash": " . . . "
  }
  }
}
```

Which will result in a version containing encrypted data being returned and stored:

```
{
  "id": "myRecord",
  "version": 1,
  "type": {
  "name": "myType",
  "version": 4
  },
  "fields": {
  "simpleField":"simpleValue",
  "myEncryptedField": {
     "keyId": " . . . ",
     "encryptedValue": " . . . "
  },
  "myOneTimeEncryptedField": {
  "keyId": " . . . ",
  "encryptedValue": " . . . ",
  "salt": " . . . "
  },
  "myEncryptedHashedField": {
  "keyId": " . . . ",
  "encryptedValue": " . . . ",
  "hash": " . . . "
  }
  }
}
```

NB This is an example for illustrative purposes, not the exact format or method used by the Gospel platform.

4.6 Effective Endorsement Consensus with Consensus on Read

One of the usually asserted "rules" of blockchain is that all participants are required to have a peer and each participant reads from its own peer. With consensus on reads, all participants are effectively communicating with the network as a whole, as opposed to a particular peer removing the disadvantage to those not having a peer, providing they are authenticated correctly.

Conversely, ensuring that an effective consensus is reached and that nobody is disadvantaged becomes a more complicated issue than with conventional blockchain. It is, therefore necessary to separate endorsing participants into categories where they provide similar functions and to set the required endorsing consensus to require a majority (or other preset proportion) of categories of participants to have endorsed, rather than just a number of participants.

As a practical example, in supply chain applications, participants at the same level of the chain, eg manufacturers of similar components, should be grouped. Otherwise two unwanted situations could arise. Firstly, any manufacturer of that particular type of component that does not have a node could be disadvantaged by their competitors. Secondly, the manufacturers at that level could manipulate the network together for a particular purpose if they constituted a majority. By having a diverse group of votes on any particular transaction, all participants can feel secure that the majority of the network has no interest in disadvantaging them.

It should be noted that the removal of the requirement for all participants to have a node significantly lowers the barrier to entry to gain the benefits of using this kind of system—many tracking, manufacturing and healthcare applications require small companies without the means to manage a node to take part and these can be achieved with the Gospel platform.

5. Access Control in the Data Layer 5.1 Access Control and Consensus

One of the true innovations delivered by the combination of methods and features outlined above is the ability to perform meaningful granular access control within the data layer, based on the consensus of the network. Decisions are made during endorsement, collectively, and then enacted after execution using the Consensus-on-Read mechanisms outlined above, without exposing sensitive data to those who are not allowed to see it. This differs greatly from the use of raw asymmetric encryption for access control in other blockchain based solutions.

Figure 9:
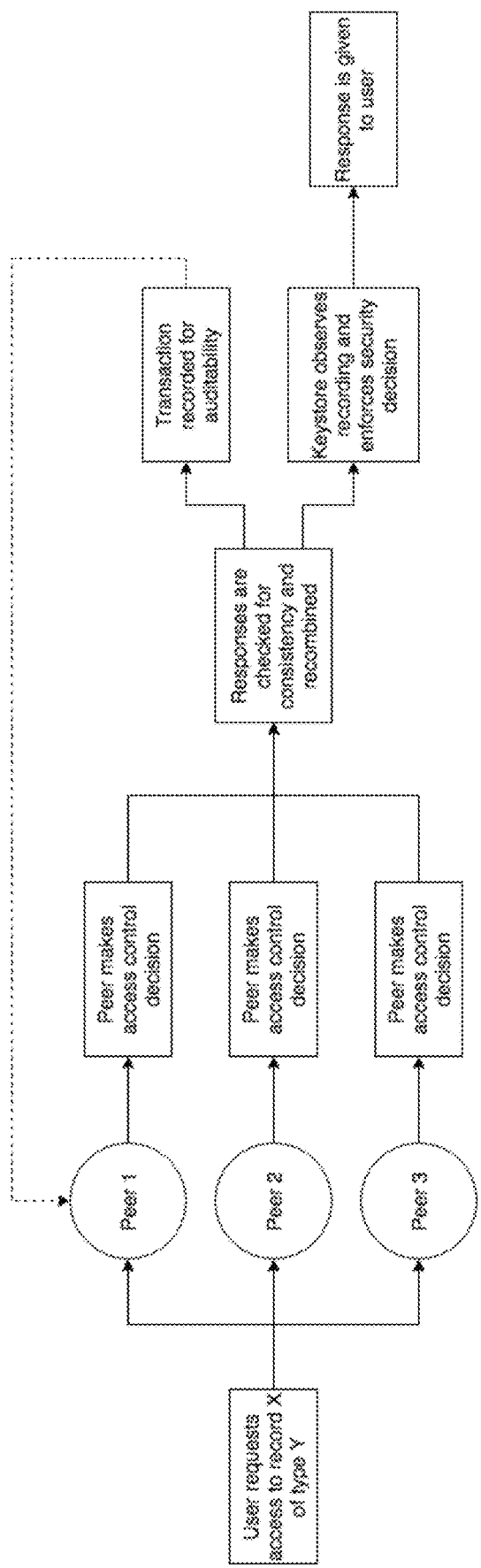
FIG. 9 shows a diagram illustrating the access control management with a keystore.

Viewed from an access control perspective, we can look at the transaction from 4.2 (FIG. 5) in a different way as shown in the diagram in FIG. 9. The user requests access to record X of type Y. Each peer makes an access control decision and the responses from the peers are checked for consistency and recombined. The keystore the recording and enforces a security decision which is then sent to the user. The transaction is also recorded for auditability.

5.2 Conventional Access Control Methods 5.2.1 Roles Based Access Control (RABC)—Too Simplistic for Data Sharing The most common access control paradigm used today is roles-based access control or RBAC. In this system, users are assigned to roles describing business functions which they carry out. For example, a plumber will have a role of plumber, but might also have one of employee and another of van driver and sometimes these roles are hierarchical—a plumber being, by definition, an employee, for example.

Permissions to carry out actions or view data are attributed to those roles—for example, users with role plumber may be allowed to purchase piping, and those with role van driver may have permission to file expenses for fuel. Where data access is concerned, typically access is assigned at table level—a corporate travel booker might have permission to view employees as they might need to book a flight for them.

This paradigm works well within single companies where there is a relatively high level of trust and other strategies such as application level controls placed on top of a data source can be trusted as they have been audited and checked. When data is share across multiple organisations, this does not hold true and in effect, the potential attack surface becomes all the data that has been shared—or where systems can be accessed directly, all the data that could be requested. The idea that a helpdesk operator can see data on employees becomes unacceptable—and RBAC usually lacks the granularity to provide suitable controls.

5.2.2 IAM and Claims Based Authentication

Another often used term is IAM or Identity and Access Management which, in generic terms, describes any system implementing a structured form of identity-based security. It has come, however, to generally describe complex systems combining claims-based (Claims Based Access Control) and role-based security such as those implemented by the major cloud providers. Permissions can be described at any level based on either the content of claims or the roles assigned.

Whilst there is no question that the level of granularity provided in many IAM systems is sufficient for managing external usage and federation of identity and claims can be achieved through mechanisms such as token servers and SAML (S. Cantor et al., Assertions and Protocols for the OASIS Security Assertion Markup Language (SAML) V2.0 2015, http://www.oasis-open.org/committees/download-.php/56776/sstc-saml-core-errata-2.0-wd-07.pdf) exchange, fundamentally the rules expressed in these systems are complex for humans to understand, audit and manage. The lack of understanding of the relation between data, especially ownership of data at record level, exacerbates this. As a result, we have previously described IAM as having a "Mythical Man Month" problem (Brooks, Fred, The Mythical Man-Month, Addison-Wesley 1975)—it is so complex that nobody can fully understand the system, but in order to effectively manage it, complete understanding is needed and adding more staff makes it worse.

5.3 Contextual Access Control 5.3.1 a Better Paradigm for Sharing

A system like Gospel will normally contain information about people and things. These will have links denoting relations between them and often a clear thread of ownership between those relations. For this reason, Gospel is presented in the form of a graph database as referenced elsewhere in this document. As we understand the relationships (or vertices), we can make these part of our security model, simplifying the description of security rules. Particular links can be marked to signify ownership and a primary hierarchy. These can then be combined with information from the user's certificate and any other available information to make informed decisions, expressed in terms a human will easily understand.

5.3.2 Identifying Data and Contextual Data

When types are defined, links are defined between fields as in other systems and relationships are defined as mandatory, unique or otherwise. In addition, a link can be defined from the type to a parent or owner, which can be another type or the current user. In this way, for any data that relates even indirectly to the current user an "ownership path" can be established.

Figure 10:
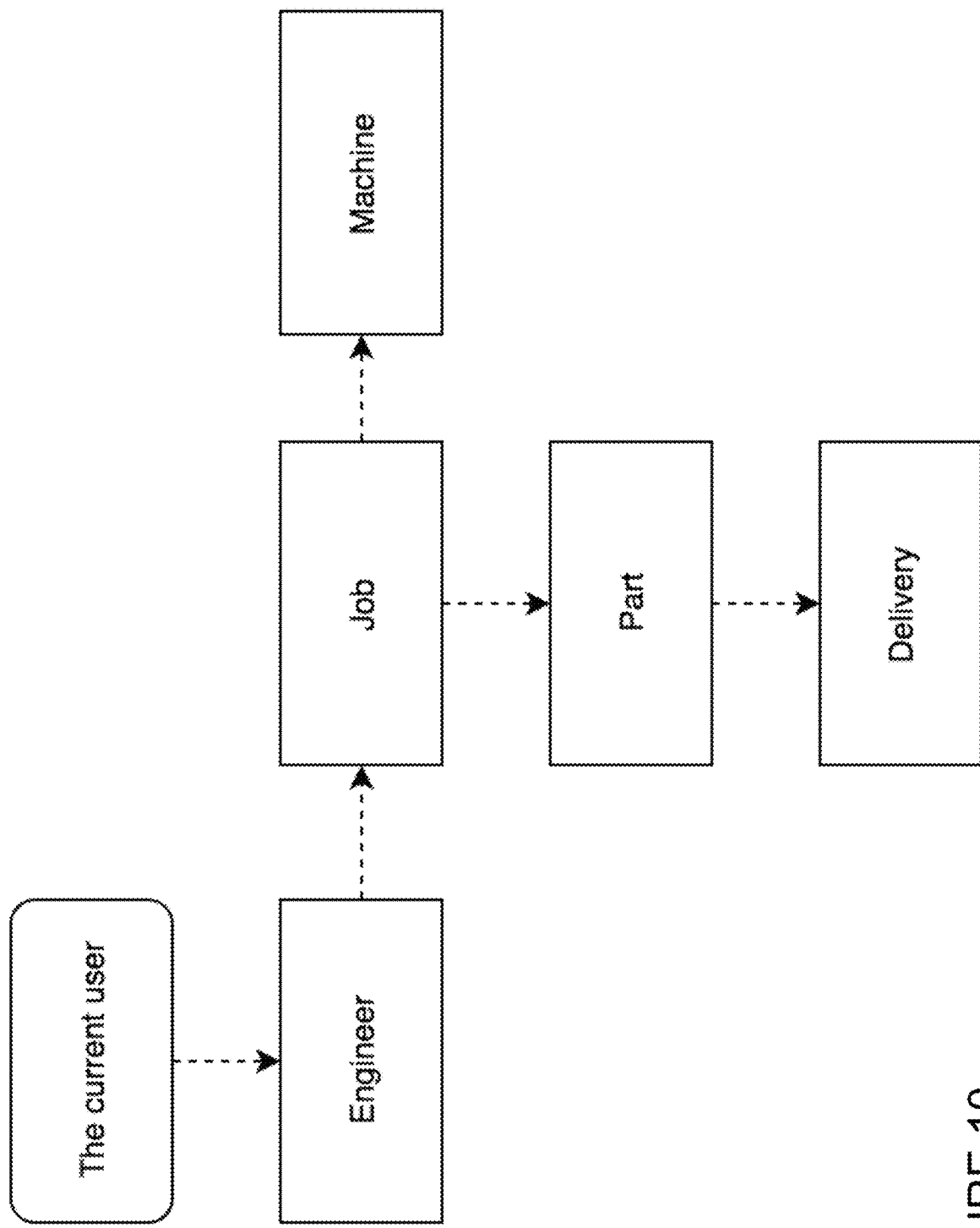
FIG. 10 shows a diagram representing a service entity or organization.

If we take the example of a service organisation replacing parts in machines, we might have a schema as illustrated FIG. 10.

Assigning a job to an engineer would establish a link between the delivery of the part being replaced. It would be desirable for engineers to be able to see this. Therefore a rule could be set allowing engineers to access information about deliveries they will need to fit, traced back to the current user. Similarly, an engineer might be able to see only machines on which they need to work and for which a part has been delivered. This is easily achieved.

5.3.3 Handling Global Concerns with Point Scores and Labels

Not all access control concerns are a matter of practical access to data—many are policy concerns. These tend to be expressed at a less granular level. Gospel implements simultaneous trust scoring of users that can be enforced at a general, type or field level. These scores are defined based on whether assertions made in certificates are met (see section 4.4) and allow us to express that our willingness to share data with a particular user is greater sat at their office desk on a company owned machine, logged in with Active Directory than when they are at home on the own computer.

Labelling is also being added, allowing assertions to be made at a wider level than single types and records based on data classification. This will allow the same kinds of rules explained below.

5.3.4 Defining Permissions with Contextual Access

Whilst a graphical system is provided to allow administrators to set permissions, these are saved as textual assertions according to a simple grammar. An array of permissions is set on a particular item—these are viewed as OR-ed together—any one may be satisfied. In addition, within a permission AND may be specified, requiring multiple conditions. It is anticipated bracketing and more complex logic will be added later. The following types of permission can currently be described:

| | |
|---|---|
| CURRENT_USER | The item may be accessed if contextually owned by the current user |
| record.fields.x eq parent.fields.y | The item may be accessed if the field x matches the field y on the contextual parent record |
| record.fields.x eq CURRENT_USER | The item may be accessed if the field specified matches the CN of the current user |
| record.fields.x eq record.links.z.fields.y | The item may be accessed if the field x matches the field y on the linked record z |
| groupname | The item may be accessed if the user is asserted to be in group groupname |
| record.fields.x(groupname) | The item may be accessed if the Boolean field x is true and the user is in group groupname (this is used for sharing consent) |
| record.fields.x eq root.fields.y | The item may be accessed if the field x matches the field y in the contextual root of trust |
| CURRENT_USER.country eq "GB" | The item may be accessed if the user is in the UK (this condition is usually better expressed with points) |
| CURRENT_USER.ip starts_with "10.0.0" | The user's IP address starts with 10.0.0 (this condition is usually better expressed with points) |

-continued

| | |
|---|---|
| certificate.country is true | The user's country matches their certificate (this condition is usually better expressed with points) |
| certificate.ip is true | The user's IP matches their certificate (this condition is usually better expressed with points) |
| CURRENT_USER AND record.fields.consent(engineers) AND CURRENT_USER.country eq "GB" | The item may be accessed if the user matches contextually to the record, the consent field is true, they are a member of the group engineers and they are located in the United Kingdom |
| parent.parent.fields.x is true | If the field x of the contextual parent of the contextual parent is true |

At any point, the predicates eq (equal), neq (not equal), eqi (case insensitive equals), neqi (case insensitive not equal), contains, not_contains, gt (greater than), ge (greater than or equal), lt (less than), le (less than or equal), is (Boolean equal), starts with, does_not_start_with are available in expressions.

5.3.5 Contextual Views

Often, sharing the underlying data is not actually required—doing so is supplying an outside organisation with the information to answer questions rather than simply answering them. Gospel therefore implements view functionality much as other data storage systems do, but with the addition that contextual access control can be combined with careful data processing to restrict the amount of data exposed. If we take a practical example, the travel booker referenced earlier does not need to see information about employees, but simply the information required to book a flight about those who need to do so. We might, therefore, restrict the content of the view to those users matching those conditions. In addition, we could return a field has_passport containing whether the underlying passport_number field is set rather than the passport number. In addition, an is_over_18 field could be calculated from the user's date of birth and the date on which they wish to travel.

6. Providing Rapid, Deterministic Access to Data Using Innovative Indexing

Data indexing is used in data systems to provide rapid access to information based on its content. This prevents the need to scan through all the data to find the record or records required, increasing efficiency and reducing computing costs at the expense of storage space. As the Gospel platform presents to the user in the form of a graph database, the use of some form of index or rapid lookup is more or less essential to provide a performant system. Common approaches include B-Trees and Balanced Trees.

6.1 Conventional Indexing

Conventionally, within a distributed system, each node will maintain its own indices and the instructions as to what they should be is distributed. This has the benefit of reducing the amount of data that must be transmitted at the cost of a degree of consistency. In most systems this is a perfectly acceptable cost and most of the potential ill-effects can be mitigated through a degree of concurrency control.

6.2 Consensus, Determinism and Execution

Within an endorsed blockchain system, the approach of allowing nodes to maintain their own indexes is possible in theory but tends to be hard to realise in practice. In particular, the need for the results to be absolutely deterministic restricts the possible approach, but the largest problem is the potential for changes to trigger long running operations that may take substantially different amounts of time to complete on different nodes, leading to significant problems with consistency.

6.2.1 Particular Challenges in the Gospel Platform

Another challenge particular to Gospel, though there are several ways it could be engineered around, is that the underlying data store is a simple key value store called Level DB (Google Inc, Level DB, https://github.com/google/leveldb). This has the characteristic that it is very fast to read keys or iterate over ranges of keys but there are no other features available. The ideal solution would, therefore, make use of the existing data store for indexing.

6.3 a Method for Deterministic Indexing of Data

To address these challenges, a system has been built which

Intrinsically supports the separation of endorsement and execution—changes to indices are calculated during the endorsement phase and applied to the ledger during execution as simple key writes.

Is truly deterministic.

Allows data to be ordered by index value quickly.

Allows features such as uniqueness to be applied to indices

A subset of the possible keys is allocated to indexing. The value of the field, or a stemmed, hashed or encoded version thereof is appended to a keyspace denoting the index in that subset. If the key is unique, that is all that is required. If it is not unique, a hash of the key stored in the value is appended to the key. Where numbers need to be encoded, the values need to be encoded to ensure the order is intrinsically saved, so a zero padded, base 62 (0-9a-zA-Z) version of the number rounded to a predetermined level of significance is stored as the value.

For example, if we wanted to store the value 61 into a unique index for the field myField on the table myTable with a significance of 1 to an ID of abc123 we would generate a key of the form FIG. 11 where the parts are separated by null characters (\0) and set the value of the field to abc123.

To encode the non-numeric value "myValue" into field myString on table myTable in a non-unique index for ID abc123 we would generate a key of the form FIG. 12.

If we only have the hash of a field (see section 4.5 above) we would store the hashed value in the index. This would allow lookups to be performed but would not provide meaningful ordering of data.

7. Gospel Platform User Interface

The Gospel Platform provides a user interface to manage records, configure the system, monitor user activity, and other features. The following provides a walk through of the steps taken by a user to access the dashboard of the Gospel Platform.

7.1 Sign in to the Gospel Data Platform

To log in to the Gospel Cloud User Interface (UI), point your browser at the URL of the UI for your Gospel network. You can also pass an argument via the URL in the form "?client="

It will attempt to take you to the relevant client, and default back to the login page if it can't find it.

When more than one namespace is set up, you will first be asked to specify the one to which you wish to log in.

Once you have done this, if multiple sources of identity have been set up you will be asked to select one, otherwise you are redirected straight to the sign in page for the one that is preselected.

Enter your login details and click "Login". You may then be asked to enter details for the "source of assurance"

application running in your environment, for example, this could be a multi factor authentication code or to enroll in MFA depending on the configuration of the server.

On successful authentication, you are redirected to the Dashboard which display real-time results regarding the activities on your system.

7.2 Dashboard

The purpose of the dashboard is to provide real-time results regarding the activities on your system. It provides a visual overview of the strategic data for your organisation at a glance, without having to navigate into the system.

Figure 13:
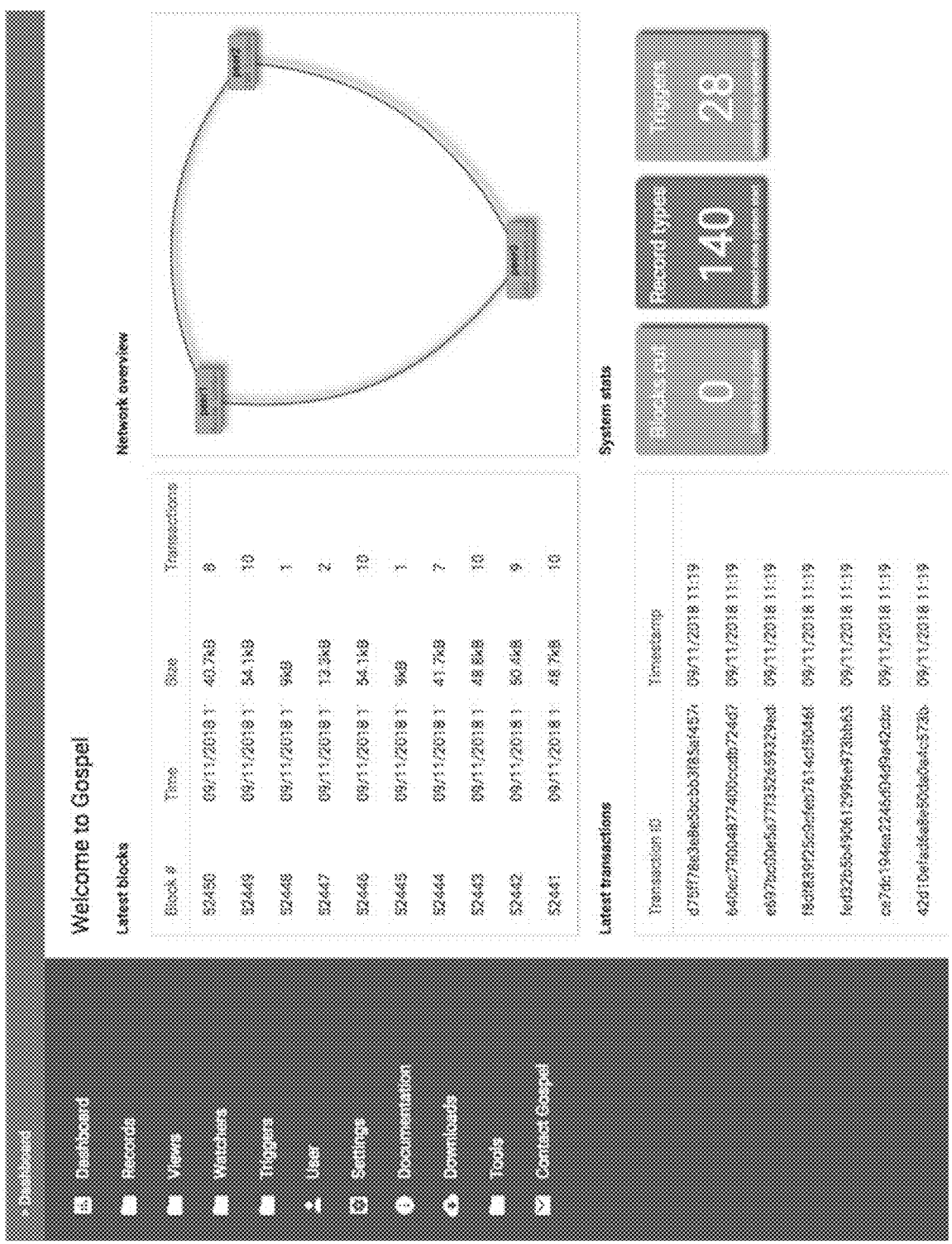
FIG. 13 shows a screenshot of a dashboard of the Gospel Platform user interface.

FIG. 13 shows a screenshot of a dashboard providing real time visuals on the following: blocks, transactions, network and system statistics.

Blocks

A block is a collection of transactions, each of which represents a read/write/other notable event within the system. Data contained within them is immutable, linking blocks via hashes makes up the basis of a blockchain. The blocks widget displays the following information:

Block: Numerical identifier of the block;
Time: The date and time when the blocks were created;
Size: The total size of the block in kilobytes (KB);
Transactions: Number of transactions made in that block.

Clicking on a block brings up further details of the block, this includes details of the transactions contained within it, but also the hash of the block, and the hash of the block it follows in the chain.

Transactions

A transaction is an "event" that has occurred within the system, this could be a user reading a record, editing a record, logging in etc—If you replay all the events that have happened, then you can build the world state. The transactions widget displays the following information:

Transaction ID: Displays the Transaction ID for the transaction
Timestamp: The date and time when the transaction was performed Clicking on a transaction via the widget will also drill you into detailed information relating to that transaction.

Network

The network overview widget provides a graphical representation of the network.

System Statistics

In this section, you can view the following system statistics: The number of blocks cut in the chain, record types and triggers created on the system.

The following key functions are also available within the dashboard such as:

Filters

The Filter function displays matched data on record fields without applying any conditions. For example, if you enter a string "Flat" in the filter field, the results display all records that contain the whole string "Flat".

Filters are:
case-sensitive;
applied to the whole string (that is, does not display partial results);
only applied to fields displayed in the record (that is, does not include hidden fields).

Advanced Search

The Advanced Search feature enables you to narrow searches for records by applying specific conditions.

The Advanced Search screen displays, where you can create the matcher by selecting a specific Field name from the Record, a Predicate and the Value of the field (the value may contain an integer or text). You can create multiple search conditions and specify the relation between matchers using the all or any options.

ALL: the search result displays only the records that satisfy all the defined conditions;
ANY of the following conditions match: the search result displays the records that satisfy any of the defined conditions.

Indexing

You can configure fields in the record definition to automatically extract values from records and store them in indexes that can be searched. Indexing enables the efficient retrieval of data in the database. When you search for a value, each field in the record is scanned to find a match. This can be a time-consuming process as the search looks through thousands of records in the record definition to find relevant matches. Using indexes, Gospel enables you to store a small portion of the data in special data structures, which supports efficient and quick search results. Indexing is used for advanced search and matches.

Indexing works with the following data input types:
Date, Number and Integer;
String;
Select one.

Field Link and Foreign Key

Data from one record can be referenced in another record using the field links option. This creates a parent-child relationship between the fields, where one record's value refers to the value in another record (usually a primary key of another record). The foreign key provides a link between data in two records.

Permissions and Types

Gospel provides various methods to manage permissions for accessing data that exists on the system. Permissions control user's ability to view and modify data that exists in the Gospel Data platform. Permissions to access data can be assigned to either all users in a group or specific users that meet the defined requirements.

The following methods may be used for identifying the user:

Group: If set, all users in the group have the same access permission. For example, all users in the Human Resources group can have read and write access to a record Induction, but users in the group Finance can have only read access to the record. The Group setting can be set for Record Definitions, Fields in records and views, Views, Watchers and Triggers.

The following options can be set only for fields in Records and Views.

Logged in User: This option can be set for records that include at least one field that contains information to identify the user (for example, username or email). This information of the current (logged on) user is matched with the field in the records to verify if the user exists, and is allowed access only if this requirement is met.

Contextual Owner: The source of context allows the user to map how different record definitions relate to each other, or to the user who owns the record. This can be achieved by specifying a parent definition, which allows the specification of how fields in differing definitions relate. Alternatively, you can set the context to the current user, which allows the specification of which field contains the user's name. This property is set in the Context option, available in the left pane on the Record Definition page.

Conditional Users: Allows access to users that are a member of the Group and when the set Field name matches the criteria. For example, users of the group Finance can have access to the record if the value for the field Travel is set to true. Only boolean fields are displayed in the drop-down.

Matcher: Allows access only when all the matcher conditions are met. The matchers can be set using the From, Predicate and Value fields. For example, when the City (From) is equal to (predicate) London (To) allow users to access the data.

The following permissions can be set for identifying what permissions are allowed:
read this field;
write to this field;
both read from and write to this field.

8. Use Cases Examples

8.1 Industrial Supply Chain

Gospel Technology facilitates trusted collaboration between all companies in a supply chain delivering absolute transparency, programmatic, traceability and accountability.

The Gospel Platform provides the following key aspects:
Improved auditability and provenance;
Accelerated and streamlined programmatic business processes;
Dramatic time and cost savings.

Figure 14:
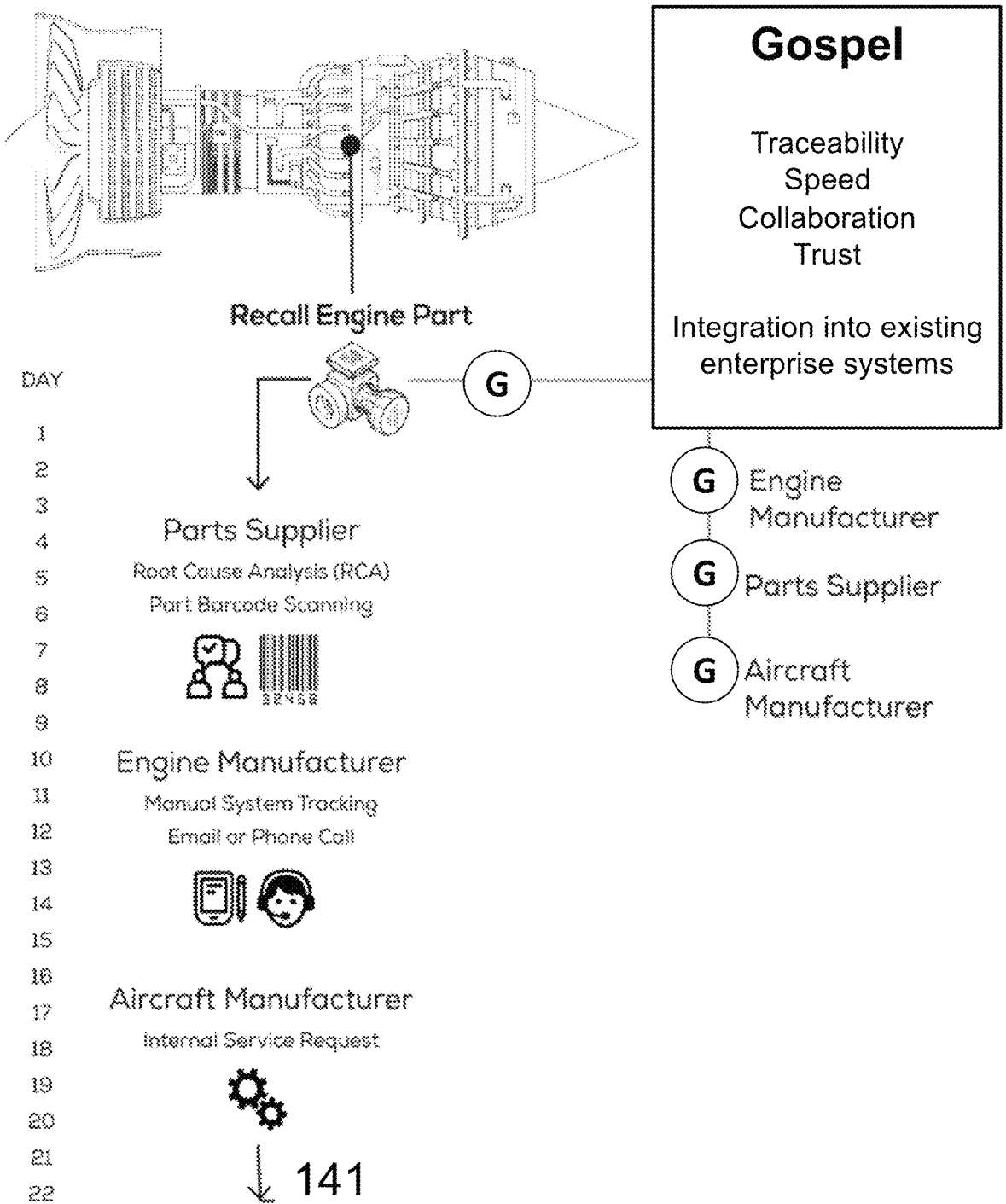
FIG. 14 shows a diagram comparing the supply chain collaboration prior to a Gospel integration and with the Gospel integration.

FIG. 14 shows a diagram comparing the supply chain collaboration prior to a Gospel integration and with the Gospel integration.

Prior the integration with the Gospel Platform (141), difficulties in tracing and locating parts information stored across disparate systems both internal and external to the organisation, while complying with border export controls meant granular traceability could take days. In cases of fault or unexpected wear and tear, this could mean unnecessarily grounding aircraft—at huge cost. Hence the system may have suffered from the following:
Costly time to recall—between 18-22 days;
High recall cost regardless of part value;
Lack of trust across suppliers;
Insecure data access;
Highly manual methods to retrieve data (emails, calls, spreadsheets);
No trusted version of the latest copy of data.

As compared, integrating the supply chain with Gospel technology provided the following key aspects:
Time to recall specific parts now within minutes;
Fast and trusted parts traceability;
Total asset & data provenance;
Secure access only to what needs to be seen;
System consensus ensures the network is always in sync and has the correct data;
Actors must prove themselves to access relevant data;
Integration into existing enterprise systems (DB's, ID authentication);
All user actions logged on immutable ledger;
Lower cost to fulfil regulatory requirements, such as DSAR's, audits and other industry requirements.

8.2 Protecting Personally Identifiable Information

Compliance in an ever-changing regulatory landscape is one of the biggest concerns facing CxOs and risk management owners today. Consumer trust is constantly being eroded by high-profile data breaches and personal information leaks affecting huge numbers of records.

Responsibility for protecting all types of personal information (PII, PHI, PCI, etc.) lies with the data controller, and individuals have the right to demand transparency and accountability of their data. Existing hub-spoke IT infrastructures are broken, too easily bypassed and vulnerable to malicious or accidental misuse.

Using the Gospel platform, modern entreprises are able to safely and ethically utilise customer data to improve their services without destroying consumer trust or falling foul of regulatory legislation. The Gospel platform provides:
Data-owner driven sharing consent;
Securely share PII, PHI and PCI data to reduce risk;
Granular, contextual access to sensitive personal data;
Regulatory compliance with GDPR, HIPAA and other global data laws;
Immutable, tamper-proof audit trail;
Data encrypted at rest and in transit.

8.3 Securing the Asset Finance Industry

Gospel provides end-to-end data protection and enables a single trusted platform for sharing personal information, bank details and financial records. Gospel is also easily integrated into organisation's existing processes to provide end-to-end security around each customer relationship.

Gospel is delivering:
An alternative to insecure email attachment transactions;
End-to-end trusted audit trail protecting customer, funder, broker and supplier from non-repudiation;
More efficient collaboration with simple contextual access controls;
Customers control over who can see their personal details;
Gospel enables customers to conduct transactions with confidence that their data is secured in line with current and future data protection regulations.

8.4 System of Record

Today's global enterprises face an unprecedented information management challenge, with corporate data siloed across multiple systems, departments and geographies.

How can businesses build, maintain and benefit from an authoritative, trusted view of their diverse data assets while avoiding costly inconsistencies, manual processes and errors?

Gospel Technology creates a single, secure information environment that enables internal and external functions to collaborate with absolute confidence in the security, integrity and validity of their data. Gospel provides:
Single, authoritative environment for corporate data;
Eliminates risks associated with manual processing;
Fully auditable and tamper-proof for regulated industry compliance;
Operates alongside or instead of existing systems of record;
Reducing IT infrastructure cost and complexity while dramatically improving operational agility.

Gospel replaces multiple disparate databases, identity platforms and legacy tools into one single distributed environment and delivers:
A scalable solution with known costs;
Ability for current and ex-employees to securely access— and grant consent to—their HR records;
Multi-party collaboration and validation without exposing sensitive information;
Internal triggers that enforce automated smart contract business logic;
Reduced costs associated with audits and compliance;
Full GDPR compliance including consent and erasure.

APPENDIX: KEY FEATURES

This section summarises the most important high-level features; an implementation of the invention may include one or more of these high-level features, or any combination of any of these. Note that each feature is therefore potentially a stand-alone invention and may be combined with any one or more other feature or features.

We organise these features into the following categories:
A. Consensus on reads
B. Consensus on reads with transactions recorded onto the blockchain
C. Consensus on reads implementing a BFT consensus algorithm
D. Consensus on reads providing granular data access
E. Consensus on reads allowing third party user access
F. Consensus on reads comprising a keystore
G. Consensus on reads implementing a distributed key algorithm
H. Consensus on reads implements right to be forgotten
I. Managing user identity by issuing ephemeral certificates
J. Contextual access control with blockchain mechanism
K. Graph Database sitting on top of blockchain A. Consensus on Reads A computer implemented method of managing access in a collaborative data sharing platform, the platform comprising blockchain nodes, the method comprising receiving a read transaction request and processing the transaction request with a consensus algorithm.

B. Consensus on Reads with Transactions Recorded onto the Blockchain.

A computer implemented method of managing access in a collaborative data sharing platform, the platform comprising blockchain nodes, the method comprising receiving a read transaction request, processing the transaction request with a consensus algorithm, and recording the transaction onto the blockchain.

C. Consensus on Reads Implementing a BFT Consensus Algorithm

A computer implemented method of managing access in a collaborative data sharing platform, the platform comprising blockchain nodes, the method comprising receiving a read transaction request, processing the transaction request with a consensus algorithm, in which the consensus algorithm is a byzantine-fault-tolerant (BFT) algorithm.

D. Consensus on Reads Providing Granular Data Access

A computer implemented method of managing access in a collaborative data sharing platform, the platform comprising blockchain nodes, the method comprising receiving a transaction request and processing the transaction request with a consensus algorithm, and in which each node defines rules or policies providing a granular access of their data.

E. Consensus on Reads Allowing Third Party User Access

A computer implemented method of managing access in a collaborative data sharing platform, the platform comprising blockchain nodes, the method comprising receiving a read transaction request, processing the transaction request with a consensus algorithm, in which the user is a third party user located externally to the blockchain nodes.

F. Consensus on Reads Comprising a Keystore

A computer implemented method of managing access in a collaborative data sharing platform, the platform comprising blockchain nodes, the method comprising:
(a) receiving a read transaction request,
(b) processing the transaction request with a consensus algorithm,
(c) sending the transaction response to a keystore which decrypts the transaction response when a consensus is reached,
(d) and recording the transaction onto the blockchain.

Optional:
Keystore permits the decryption of data only if a transaction is correctly endorsed or approved by the consensus algorithm.
Keystore permits the decryption of data only if a defined number of decryption key owners agree.
Keystore is located externally to the blockchain nodes,
Keystore is located locally to the blockchain nodes of the user that requested the transaction.
Each peer simulates the transaction request and sends its signed response.
Responses are combined and submitted to the keystore.
Multiple keystores for different types of data are available in a collaborative data sharing platform.
Keystore does not store keys and implements a key derivation function.
Keystore encodes and decodes data based on parts of keys unknown to the peers themselves.
Keystore decrypts the transaction response and sends it to the user.
A transaction request is recorded onto the blockchain by cutting a block and distributing it onto the blockchain.

G. Consensus on Reads Implementing a Distributed Key Algorithm

A computer implemented method of managing access in a collaborative data sharing platform, the platform comprising blockchain nodes, the method comprising
(a) receiving a read transaction request,
(b) generating an initial encryption key and distributing a set of keys derived from the initial key to a subset of selected endorsed peers,
(c) processing the transaction request by the subset of selected endorsed peers with a consensus algorithm,
(d) recording the transaction onto the blockchain.

Optional:
Selected numbed of endorsed peers is the minimum number of peers needed to recover the initial key.
The set of keys are derived by a key derivation algorithm.
Key derivation algorithm includes selecting a constant Hamming distance based on the minimum number of peers.
The constant Hamming distance is selected using Reed-Solomon codes.
The set of keys are distributed in a BFT manner.
Peers within a same class are distributed the same key.
A keystore is used to derive the set of keys from the initial key.
Data stored in the blockchain can be redacted without being recoverable.
Personally identifiable information data can be stored in the blockchain.

H. Consensus on Reads Implements Right to be Forgotten

A computer implemented method of managing access in a collaborative data sharing platform, the platform comprising blockchain nodes, the method comprising receiving a read transaction request, in which personally identifiable information (PII) data that is stored in the blockchain is rendered unreadable.

Optional:
In which PII data is rendered unreadable permanently.
In which an additional key identifier is stored with the PII data.
The additional key identifier relates to a value stored within a keystore of the PII data owner.
The additional key identifier is added to the key derivation value.

I. Managing User Identity by Issuing Ephemeral Certificates

A computer implemented method of managing access in a collaborative data sharing platform, the platform comprising blockchain nodes, the method comprising receiving a read transaction request, processing the transaction request with a consensus algorithm and recording the transaction onto the blockchain, in which a certificate authority processes a user transaction request and issues ephemeral certificates for accessing the platform.

Depending features:
Identity of the user is communicated within the blockchain by encoding a series of assertions and conditions into the certificate.
Certificate includes a certificate signing request (CSR) information section.
The method includes the step of sending a Certificate Signing Request (CSR) to a cross endorsing Certificate Authority (CA).
Cross-endorsing CA returns both a signature over a CSR information section of the certificate as well as any assertions it wishes to add.
A certificate is revoked when a user logs out of the platform.
Method implements *Byzantine* Fault Tolerant (BFT) techniques.
Hashes of canonicalized transaction inputs and outputs are stored.

J. Contextual Access Control with Blockchain Mechanism

A computer implemented method of managing access in a collaborative data sharing platform, the platform comprising blockchain nodes, the method comprising receiving a read transaction request, processing the transaction request with a consensus algorithm and recording the transaction onto the blockchain, in which access control of data within the platform is based on contextual access control.

Optional:
Each node defines rules or policies providing a granular access of their data.
In which access control of data or resource within the blockchain is provided to an entity or user when the context information of the user matches the rule or policy associated with the requested data.
Context information includes who the user is, what they are doing and how they are doing it.
Context information also includes intent of the user.
The method includes the step of processing a user transaction request and deriving the user's intent.
User's intent is stored in the form of protocol buffers format.
Endorsement policies define the entities of the blockchain able to endorse access control of specific data or resource.
Endorsement policy requires a predefined number of entities to endorse access control of specific data or resources.
The method further implements a hierarchical based access control.
In which access control is provided by a consensus agreement of all entities or users and of the owner of the data.

K. Graph Database Sitting on Top of Blockchain

A computer implemented method of managing access in a collaborative data sharing platform, the platform comprising blockchain nodes, in which a plurality of entities are represented in the form of a graph database that is linked to the nodes of the blockchain.

Optional:
An entity is a user, node, peer or other subsystem of the blockchain.
Graph database encodes one or more rules or policies for accessing a specific data or resource of the blockchain.
Graph database encodes an ownership path for each data or resource of the blockchain.
A rule includes that data can only be viewed if a number of conditions are satisfied.
A rule includes that data cannot be viewed but questions on the data can be answered.
Access control of data is based on contextual access control, such as who the user is, what they are doing, how they are doing it.
Graph database encodes the entities or users contextual information.
Graph database is a shared store of enterprise information.
Graph database is a distributed graph database that runs on top of the blockchain nodes.

Generally Applicable Optional Features:
Consensus algorithm relates to an algorithm that determines if there is a collective agreement amongst the peers, nodes or other subsystem of the blockchain.
Consensus algorithm permits the read when a quorum of signatures for the blockchain is reached.
Consensus algorithm permits the read to take place only if there is a consensus amongst the peers, nodes, or other subsystem of the blockchain to permit the read.
The method can also be used to process a write transaction request.
The consensus algorithm also processes a write transaction request as well as a read transaction request.
Consensus algorithm uses a proof of authority algorithm.
BFT is practical BFT.
The method further includes the step of recording the user's intent on the blockchain, such as what the user is trying to do.
A transaction request is recorded onto the blockchain by cutting a block and distributing it onto the blockchain.
The consensus algorithm decides which node cuts the block.
A node within the blockchain cannot bypass the consensus algorithm in order to access the blockchain.
The method implements a deterministic index algorithm for indexing the data in the blockchain nodes.
The method is used to prevent data access to the blockchain.
The method is performed in real time.

Note

It is to be understood that the above-referenced arrangements are only illustrative of the application for the principles of the present invention. Numerous modifications and alternative arrangements can be devised without departing from the spirit and scope of the present invention. While the present invention has been shown in the drawings and fully described above with particularity and detail in connection with what is presently deemed to be the most practical and preferred example(s) of the invention, it will be apparent to those of ordinary skill in the art that numerous modifications can be made without departing from the principles and concepts of the invention as set forth herein.

The invention claimed is:

1. A computer implemented method of managing access in a collaborative data sharing platform, the platform comprising blockchain nodes, the method comprising receiving a read transaction request and processing the transaction request with a consensus algorithm, in which the read transaction request is only processed when a consensus is reached amongst peers, nodes or another subsystem of the blockchain;

in which the consensus algorithm is a byzantine-fault-tolerant (BFT);

in which the method comprises: (i) generating an initial encryption key and distributing a set of keys derived from the initial key to a subset of selected endorsed peers, (ii) processing the transaction request by the subset of selected endorsed peers with a consensus algorithm, (iii) sending a response to the transaction request to a keystore which decrypts the transaction response when a consensus is reached, and (iv) recording the transaction onto the blockchain;

in which each selected endorsed peer of the blockchain simulates the transaction request and sends signed responses and in which responses are combined and submitted to the keystore; and in which the keystore encodes and decodes data based on parts of keys unknown to the peers themselves, and in which the keystore decrypts the transaction response and sends it to the user that requested the transaction.

2. The method of claim 1, in which the method further includes recording the transaction onto the blockchain.

3. The method of claim 1, in which each node defines rules or policies providing a granular access of their data.

4. The method of claim 1, in which the transaction request is requested by a user that is a third party user located externally to the blockchain nodes.

5. The method of claim 1, in which the consensus algorithm relates to an algorithm that determines if there is a collective agreement amongst the peers, nodes or other subsystem of the blockchain.

6. The method of claim 1, in which the consensus algorithm permits the read transaction when a quorum of signatures for the blockchain is reached.

7. The method of claim 1, in which the method is also used to process a write transaction request, and in which the consensus algorithm processes the write transaction request as well as the read transaction request.

8. The method of claim 1, in which the method further includes the step of recording a user's intent on the blockchain, in which intent refers, at least in part, to what the user is trying to do.

9. The method of claim 1, in which the transaction request is recorded onto the blockchain by cutting a block and distributing it onto the blockchain and in which the consensus algorithm decides which node cuts the block.

10. The method of claim 1, in which a node within the blockchain cannot access the blockchain, such as read or write onto the blockchain, without the read or write being approved by the consensus algorithm amongst a selected number of peers or nodes.

11. The method of claim 1, in which the method further implements a deterministic index algorithm for indexing the data in the blockchain nodes.

12. The method of claim 1, in which the method is used to prevent data access to the blockchain and in which the cryptographically secured data stored within the blockchain can only be accessed and made useable when a consensus amongst a selected number of peers or nodes is reached.

13. The method of claim 1, in which the method is performed in real time.

14. The method of claim 1, in which the keystore is either located externally to the blockchain nodes or is located locally to the blockchain nodes of the user that requested the transaction.

15. The method of claim 1, in which multiple keystores for different types of data are available in the collaborative data sharing platform.

16. The method of claim 1, in which the keystore does not store keys and implements a key derivation function.

17. The method of claim 1, in which the selected numbered of endorsed peers is the minimum number of peers needed to recover the initial key.

18. The method of claim 17, in which the set of keys are derived by a key derivation algorithm and, in which the key derivation algorithm includes selecting a constant Hamming distance based on the minimum number of peers.

19. The method of claim 1, in which the set of keys are distributed in a BFT manner.

20. The method of claim 1, in which peers within a same class are distributed the same key.

21. The method of claim 1, in which a keystore is used to derive the set of keys from the initial key.

22. The method of claim 21, in which data stored in the blockchain can be redacted or deleted without being recoverable once it has been redacted or deleted from the blockchain, and in which the one or more keys corresponding to the redacted or deleted data are destroyed.

23. The method of claim 1, in which personally identifiable information (PII) data can be stored in the blockchain.

24. The method of claim 1, in which PII data that is stored in the blockchain is rendered unreadable.

25. A computer implemented system of managing the access in a collaborative data sharing platform, in which the collaborative data sharing platform comprises blockchain nodes, and in which the system is configured to receive a read transaction request and to process the transaction request with a consensus algorithm, in which the read transaction request is only processed when a consensus is reached amongst peers, nodes or other subsystem of the blockchain;

in which the consensus algorithm is a byzantine-fault-tolerant (BFT) algorithm;

in which the system: (i) generating an initial encryption key and distributing a set of keys derived from the initial key to a subset of selected endorsed peers, (ii) processing the transaction request by the subset of selected endorsed peers with a consensus algorithm, (iii) sending a response to the transaction request to a keystore which decrypts the transaction response when a consensus is reached, and (iv) recording the transaction onto the blockchain;

in which each selected endorsed peer of the blockchain stimulates the transaction request and sends signed responses and in which responses are combined and submitted to the keystore; and in which the keystore encodes and decodes data based on parts of keys unknown to the peers themselves, and in which the keystore decrypts the transaction response and send it to the user that requested the transaction.

* * * * *